(12) United States Patent
Iwasaki

(10) Patent No.: US 7,901,125 B2
(45) Date of Patent: Mar. 8, 2011

(54) WEDGE-SHAPED LIGHTING DEVICE

(75) Inventor: Osamu Iwasaki, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 183 days.

(21) Appl. No.: 12/161,847

(22) PCT Filed: Jan. 23, 2007

(86) PCT No.: PCT/JP2007/050964
§ 371 (c)(1),
(2), (4) Date: Jul. 23, 2008

(87) PCT Pub. No.: WO2007/083805
PCT Pub. Date: Jul. 26, 2007

(65) Prior Publication Data
US 2009/0196069 A1 Aug. 6, 2009

(30) Foreign Application Priority Data

Jan. 23, 2006 (JP) .................................. 2006-014178
Jun. 20, 2006 (JP) .................................. 2006-170690

(51) Int. Cl.
*F21V 7/09* (2006.01)
*F21V 7/22* (2006.01)

(52) U.S. Cl. .......................... 362/628; 362/615; 362/629

(58) Field of Classification Search .................. 362/616, 362/617, 628, 629, 615
See application file for complete search history.

(56) References Cited

U.S. PATENT DOCUMENTS

| | | | | |
|---|---|---|---|---|
| 3,984,176 A | * | 10/1976 | Hirai et al. | 349/65 |
| 4,779,166 A | * | 10/1988 | Tanaka et al. | 362/629 |
| 5,055,978 A | * | 10/1991 | Rogoff | 362/614 |
| 5,101,325 A | * | 3/1992 | Davenport et al. | 362/628 |
| 5,993,020 A | | 11/1999 | Koike | |
| 6,217,184 B1 | | 4/2001 | Koike et al. | |
| 6,447,133 B1 | * | 9/2002 | Eschke et al. | 362/629 |
| 6,908,203 B2 | * | 6/2005 | Yu et al. | 362/27 |
| 7,604,387 B2 | * | 10/2009 | Liu | 362/606 |
| 2001/0019479 A1 | | 9/2001 | Nakabayashi et al. | |
| 2003/0137821 A1 | * | 7/2003 | Gotoh et al. | 362/31 |
| 2004/0032388 A1 | | 2/2004 | Tsai et al. | |
| 2004/0130884 A1 | | 7/2004 | Yoo et al. | |
| 2004/0130912 A1 | | 7/2004 | Miyashita | |

(Continued)

FOREIGN PATENT DOCUMENTS

CN 1512240 A 7/2004

(Continued)

OTHER PUBLICATIONS

International Preliminary Report on Patentability mailed Aug. 7, 2008, in International Application No. PCT/JP2007/050964.

(Continued)

*Primary Examiner* — Ismael Negron
(74) *Attorney, Agent, or Firm* — Sughrue Mion, PLLC

(57) ABSTRACT

A wedge shaped lighting device includes a light source and a light guide plate disposed opposite to the light source, and the light guide plate includes a light entrance plane opposite to the light source and a light exit plane containing one side of the light entrance plane, and has a shape growing thicker in direction perpendicular to the light exit plane with the increasing distance from the light entrance plane and contains scattering particles for scattering light entering through the light entrance plane and propagating the inside thereof.

23 Claims, 17 Drawing Sheets

U.S. PATENT DOCUMENTS

| | | |
|---|---|---|
| 2005/0180167 A1* | 8/2005 | Hoelen et al. ............... 362/613 |
| 2005/0231976 A1* | 10/2005 | Keuper et al. ............... 362/600 |
| 2006/0061705 A1* | 3/2006 | Onishi ............................ 349/62 |
| 2006/0104091 A1* | 5/2006 | Chen et al. ................... 362/621 |
| 2006/0146573 A1 | 7/2006 | Iwauchi et al. |
| 2007/0064417 A1 | 3/2007 | Hatanaka et al. |
| 2008/0285306 A1 | 11/2008 | Sugihara et al. |
| 2009/0316072 A1* | 12/2009 | Okumura et al. ............... 349/64 |

FOREIGN PATENT DOCUMENTS

| | | |
|---|---|---|
| FR | 2 260 119 | 8/1975 |
| JP | 01-073710 U | 5/1989 |
| JP | 07-036037 A | 2/1995 |
| JP | 08-248233 A | 9/1996 |
| JP | 08-271739 A | 10/1996 |
| JP | 11-064641 A | 3/1999 |
| JP | 11-153963 A | 6/1999 |
| JP | 2001-093318 A | 4/2001 |
| JP | 2003-021727 A | 1/2003 |
| JP | 2004-109992 A | 4/2004 |
| JP | 2004-200093 A | 7/2004 |
| JP | 2004-241237 A | 8/2004 |
| JP | 2005-183005 A | 7/2005 |
| WO | 03/048635 A1 | 6/2003 |
| WO | 03/083530 A1 | 10/2003 |
| WO | 2004-055429 A1 | 7/2004 |
| WO | WO 2004055429 A1 * | 7/2004 |
| WO | 2006/001383 A1 | 1/2006 |

OTHER PUBLICATIONS

CN First Office Action, dated Jul. 24, 2009, issued in corresponding CN Application No. 200780002876.8, 11 pages in English and Chinese.

EP Communication, dated Jun. 15, 2010, issued in corresponding EP Application No. 07707227.0, 7 pages.

Notice of Reasons for Rejection, dated Nov. 9, 2010, issued in corresponding JP Application No. 2007-555001, 11 pages in English and Japanese.

* cited by examiner

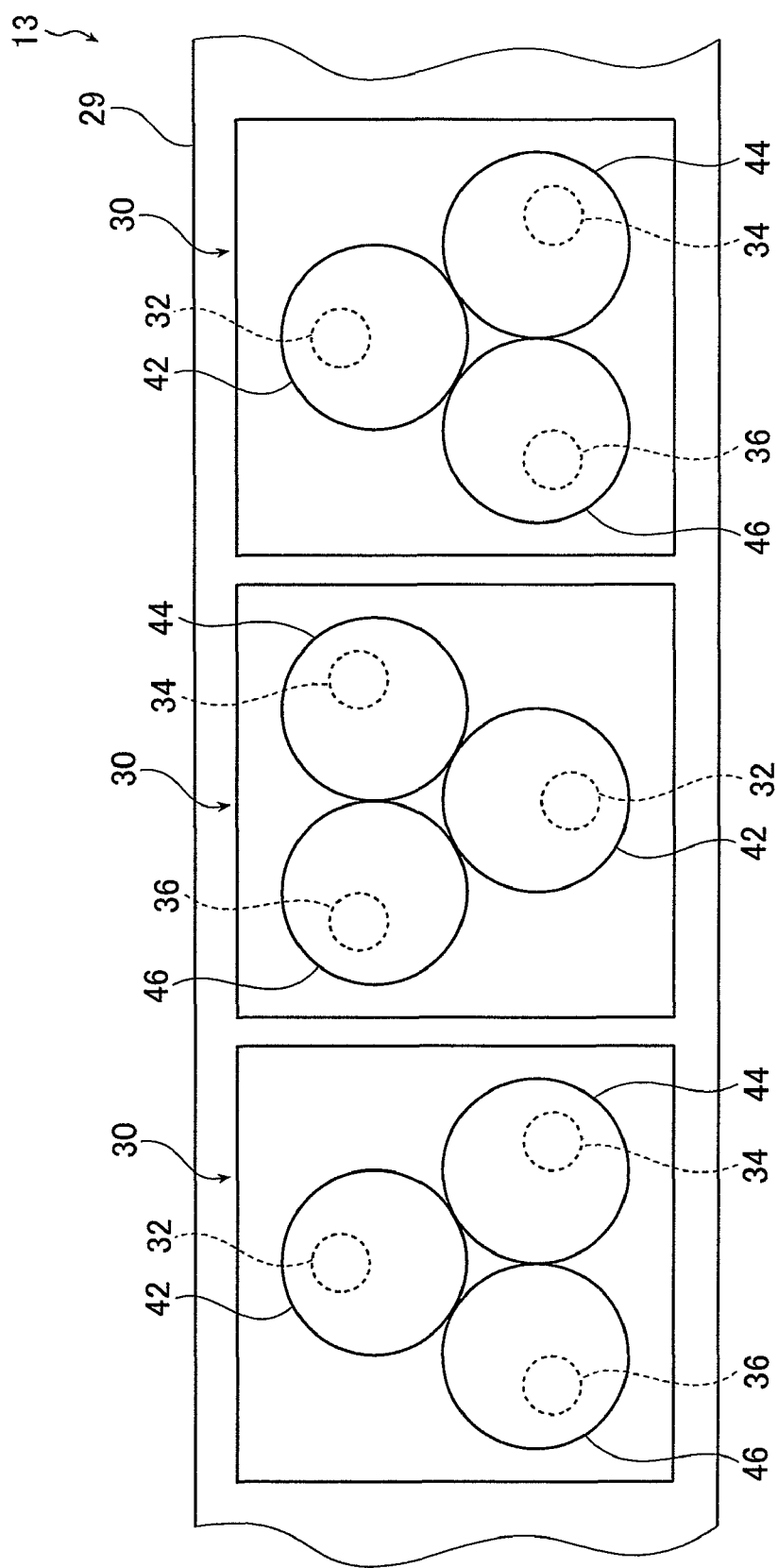

FIG.18A
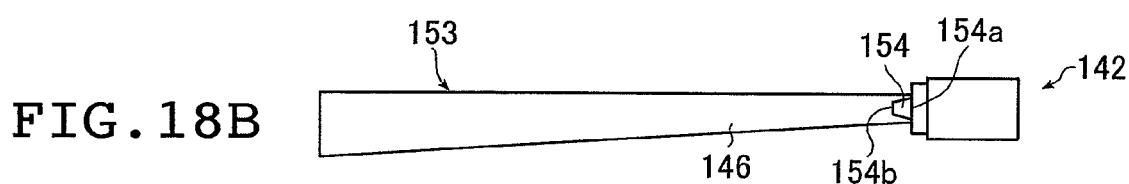
FIG.18B
FIG.18C
FIG.19
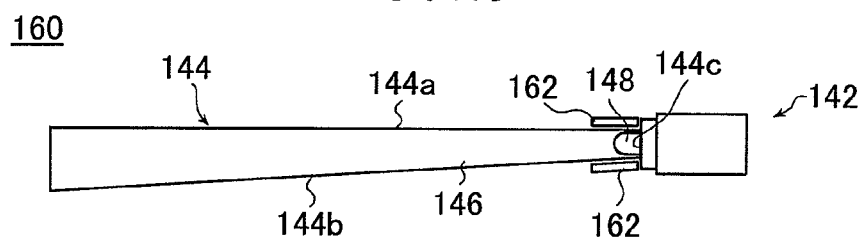
FIG.20
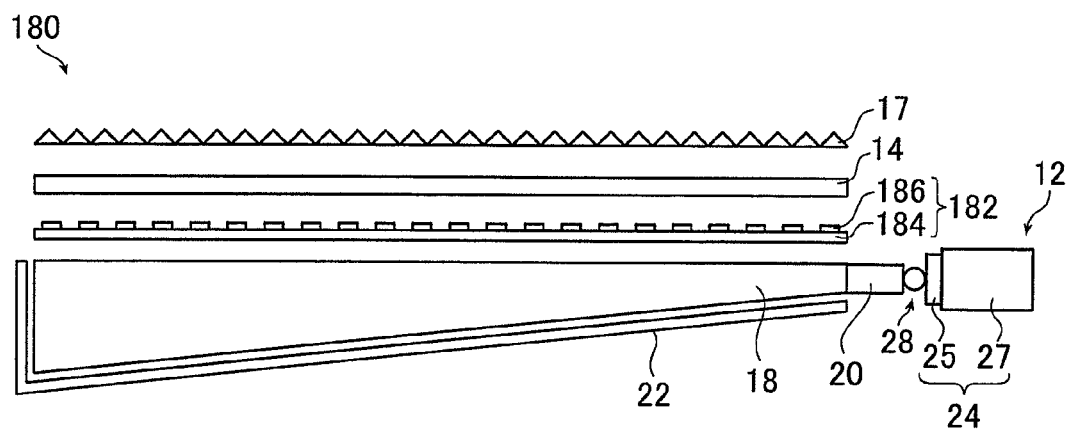

WEDGE-SHAPED LIGHTING DEVICE

CROSS REFERENCE TO RELATED APPLICATION

This application is a National Stage of International Application No. PCT/JP2007/050964 filed Jan. 23, 2007, claiming priority based on Japanese Patent Application Nos. 2006-014178, filed Jan. 23, 2006 and 2006-170690, filed Jun. 20, 2006, the contents of all of which are incorporated herein by reference in their entirety.

TECHNICAL FIELD

The present invention relates to a planar lighting device used in liquid crystal display devices and the like.

BACKGROUND ART

Liquid crystal display devices use a backlight unit for radiating light from behind the liquid crystal display panel to illuminate the liquid crystal display panel. A backlight unit is configured using a light guide plate for diffusing light emitted by an illumination light source to irradiate the liquid crystal display panel and parts such as a prism sheet and a diffusion sheet for uniforming the light emitted from the light guide plate.

Currently, large liquid crystal televisions predominantly use a so-called direct illumination type backlight unit comprising a light guide plate disposed immediately above the illumination light source. This type of backlight unit comprises a plurality of cold cathode tubes serving as a light source provided behind the liquid crystal display panel whereas the inside of the backlight unit provides white reflection surfaces to secure uniform light amount distribution and necessary brightness.

To achieve a uniform light amount distribution with a direct illumination type backlight unit, however, a thickness of about 30 mm in a direction perpendicular to the liquid crystal display panel is required. While demands of still thinner backlight units are expected to grow in the future, achieving a thickness of 10 mm or less with a direct illumination type backlight unit is deemed difficult in view of uneven light amount distribution expected to accompany that type.

Thus, there has been proposed a backlight unit of a type using a light guide plate that is formed of a transparent resin containing scattering particles for diffusing light (see, for example, JP 07-36037 A (PATENT DOCUMENT 1), JP 08-248233 A (PATENT DOCUMENT 2), JP 08-271739 A (PATENT DOCUMENT 3), and JP 11-153963 A (PATENT DOCUMENT 4).

For example, JP 08-271739 A discloses a planar light source composed of a wedge-shaped light diffusion light guide member formed of PMMA containing evenly dispersed therein silicone-based resin powder of small particle diameters having a different refractive index, a light source (fluorescent lamp) disposed adjacent the light diffusion light guide member, a light emission direction correcting element facing a light extraction plane of the light diffusion light guide member and having a repeated undulate pattern of prism arrays, and a reflector disposed opposite to the rear side of the light diffusion light guide member.

In the planar lighting device mentioned above, light emitted by the light source and launched or admitted through the light entrance plane into the light diffusion light guide member receives a single or a multiple scattering effect at a given rate as the light propagates through the inside of the light diffusion light guide member. Moreover, a significant proportion of light that reaches both end planes of the light diffusion light guide member or a surface of the reflector is reflected and returned into the light diffusion light guide member.

The above composite process produces light beam that is emitted through the light exit plane highly efficiently with a directivity to travel obliquely forward as viewed from the direction of the light source. Briefly, light radiated by the light source is emitted through the light extraction plane of the light diffusion light guide member.

Thus, the prior art literature mentioned above purportedly states that a light guide plate containing scattering particles mixed therein is capable of emitting uniform light with a high light emission efficiency.

As regards the light guide plate containing scattering particles mixed therein, there have been disclosed a light guide plate in the form of a flat plate and a light guide plate composed of wedge-shaped light guide plates abutted to each other, besides the wedge-shaped light guide plate mentioned above.

| [PATENT DOCUMENT 1]: | JP 07-36037 A |
| [PATENT DOCUMENT 2]: | JP 08-248233 A |
| [PATENT DOCUMENT 3]: | JP 08-271739 A |
| [PATENT DOCUMENT 4]: | JP 11-153963 A |

DISCLOSURE OF THE INVENTION

Problems to be Solved by the Invention

However, to achieve increased dimensions with a planar lighting device using any of the light guide plates disclosed in JP 07-36037 A, JP 08-248233 A, JP 08-271739 A, and JP 11-153963 A, light needs to reach a farther position from the light source, which in turn requires the light guide plate itself to be made thicker. Thus, reducing the thickness and the weight of the planar lighting device remains a challenge to be overcome.

Further, the shape as disclosed in JP 07-36037 A, JP 08-248233 A, JP 08-271739 A, and JP 11-153963 A having a tendency to decrease in thickness with the increasing distance from a position at which light from the light source is launched or the flat plate shape also poses a problem that a limited distance that light is capable of traveling confines the extent to which the dimensions can be increased.

An object of the present invention is to provide a thin, lightweight planar lighting device that eliminates the problems the above prior art inherently has suffered, is capable of emitting uniform illumination light free from brightness unevenness, and permits designing with increased dimensions.

Means to Solve the Problems

To solve the above problems, the present invention provides a planar lighting device comprising a light source and at least one light guide plate disposed opposite to the light source, wherein the light guide plate has a light entrance plane opposite to the light source and a light exit plane containing one side of the light entrance plane and having a rectangular external shape, wherein the light guide plate has a shape having such a thickness perpendicular to the light exit plane that increases with an increasing distance from the light entrance plane, and wherein the light guide plate contains scattering particles for scattering light entering through the light entrance plane and propagating inside of the light guide plate.

In other words, the present invention provides a planar lighting device comprising a light source and at least one light guide plate disposed opposite to the light source, wherein the light guide plate has a light entrance plane opposite to the light source and a light exit plane containing one side of the light entrance plane and increases in thickness perpendicular to the light exit plane with an increasing distance from the light entrance plane, and wherein the light guide plate contains scattering particles for scattering light entering through the light entrance plane and propagating inside of the light guide plate.

Preferably, the light exit plane is parallel to a direction of optical axis of the light emitted by the light source and incident on the light entrance plane, and a plane of an opposite side of the light exit plane is inclined with respect to the direction of optical axis.

Alternatively, it is preferable that the light exit plane is inclined with respect to a direction of optical axis of the light emitted by the light source and incident on the light entrance plane, and that a plane of an opposite side of the light exit plane is parallel to the direction of optical axis.

Alternatively, it is preferable that the light exit plane and a plane of an opposite side of the light exit plane are inclined with respect to a direction of optical axis of the light emitted by the light source and incident on the light entrance plane.

Alternatively, it is preferable that the light exit plane of the light guide plate and a plane of the light guide plate in an opposite side of the light exit plane are inclined symmetrically with respect to a direction of optical axis of the light emitted by the light source and incident on the light entrance plane in a cross section perpendicular to the light exit plane and perpendicular to the one side.

Preferably, at least one of the light exit plane and a plane of an opposite side of the light exit plane has at least one of an outwardly curved shape and an inwardly curved shape with respect to a direction of optical axis of the light emitted by the light source and incident on the light entrance plane.

The planar lighting device of the invention preferably comprises two or more of the light guide plates arranged such that a plane containing one side of the light exit plane and one side of the light entrance plane of one of the light guide plates on the one hand and a plane containing one side of the light exit plane and one side of the light entrance plane of another of the light guide plates on the other hand are disposed adjacent each other.

Preferably, the light is emitted only from a side of the light exit plane.

Preferably, the planar lighting device comprises a reflection film disposed opposite to a plane of an opposite side of the light guide plate with respect to the light exit plane.

It is preferable that the light exit plane of the light guide plate is a first light exit plane and that a plane of an opposite side of the first light exit plane is a second light exit plane.

The scattering particles contained in the light guide plate preferably satisfy an expression (1) below:

$$1.1 \leq \Phi \cdot N_P \cdot L_G \cdot K_C \leq 8.2 \quad (1)$$

(where $\Phi$ denotes a scattering cross section of the scattering particles, $L_G$ denotes a length of the light guide plate in a direction in which the light is launched, $N_p$ denotes a density of the scattering particles, and $K_C$ denotes a compensation coefficient in a range of $0.005 \leq K_C \leq 0.1$.

The light guide plate is preferably formed of a transparent resin containing at least a plasticizer mixed therein.

Preferably, the light source is configured using an LED array comprising RGB-LEDs arranged in a row, each including a red light emitting diode, a green light emitting diode, and a blue light emitting diode; and lenses, each provided respectively for the red light emitting diode, the green light emitting diode and the blue light emitting diode on a light emitting side.

The lenses are preferably spherical, transparent ball lenses.

Alternatively, it is preferable that the light source is an LED array comprising LED chips and a support member carrying the LED chips arranged in a row, and that a relationship p>b>a is satisfied, where "a" denotes a length of each of the LED chips in a direction perpendicular to the light exit plane of the light guide plate, "b" denotes a length of each of the LED chips in a direction of arrangement of the LED array, and "p" denotes a pitch of arrangement of the LED array.

Further, it is preferable that the light source comprises two or more of the LED arrays, and that the light source has a configuration such that the LED arrays are stacked by using at least one of a mechanical joining method and a chemical bonding method in such a way that the LED chips of one of the LED arrays and LED chips of another of the LED arrays are spaced a preset distance apart from each other.

The light guide plate is preferably provided with diffusion reflectors on at least one plane of the light guide plate excluding the light entrance plane.

Preferably, the diffusion reflectors are provided at a density increasing with an increasing distance from the light entrance plane.

The diffusion reflectors are preferably provided on a plane of an opposite side of the light exit plane.

Preferably, part of the light guide plate closer to the light entrance plane is formed of a different material than other parts of the light guide plate such that a relationship Nm>Ni is satisfied, where Nm denotes a refractive index of a material forming the part closer to the light entrance plane and Ni denotes a refractive index of a material forming the other part.

Preferably, the planar lighting device further comprises reflection members provided on the light exit plane and a plane of an opposite side of the light exit plane close to the light entrance plane of the light guide plate.

Effects of the Invention

According to the planar lighting device of the present invention, light launched through the light entrance plane can reach a farther position in a light guide plate having a light entrance plane that is thin in a direction perpendicular to the light exit plane. This makes it possible to emit uniform illumination light free from brightness unevenness and achieve a thin, lightweight design with increased dimensions.

Further, the planes on both sides of the light guide plate may be used as light exit plane, emitting light through both the first light exit plane and the second light exit plane, the latter being on the side opposite from the former.

BRIEF DESCRIPTION OF THE DRAWINGS

FIG. 5 is a view schematically illustrating how a plurality of RGB-LEDs configured using three kinds of light emitting diodes each representing colors of red, blue, and green are arranged.

FIGS. 18A to 18C are schematic sectional views illustrating configurations of other examples of the light guide plate used in the planar lighting device according to the third embodiment of the invention.

FIG. 19 is a schematic sectional view illustrating a configuration of another example of the planar lighting device according to the third embodiment of the invention.

FIG. 20 is a schematic sectional view illustrating an example of the planar lighting device having a transmittance adjusting member.

Figure 1A:
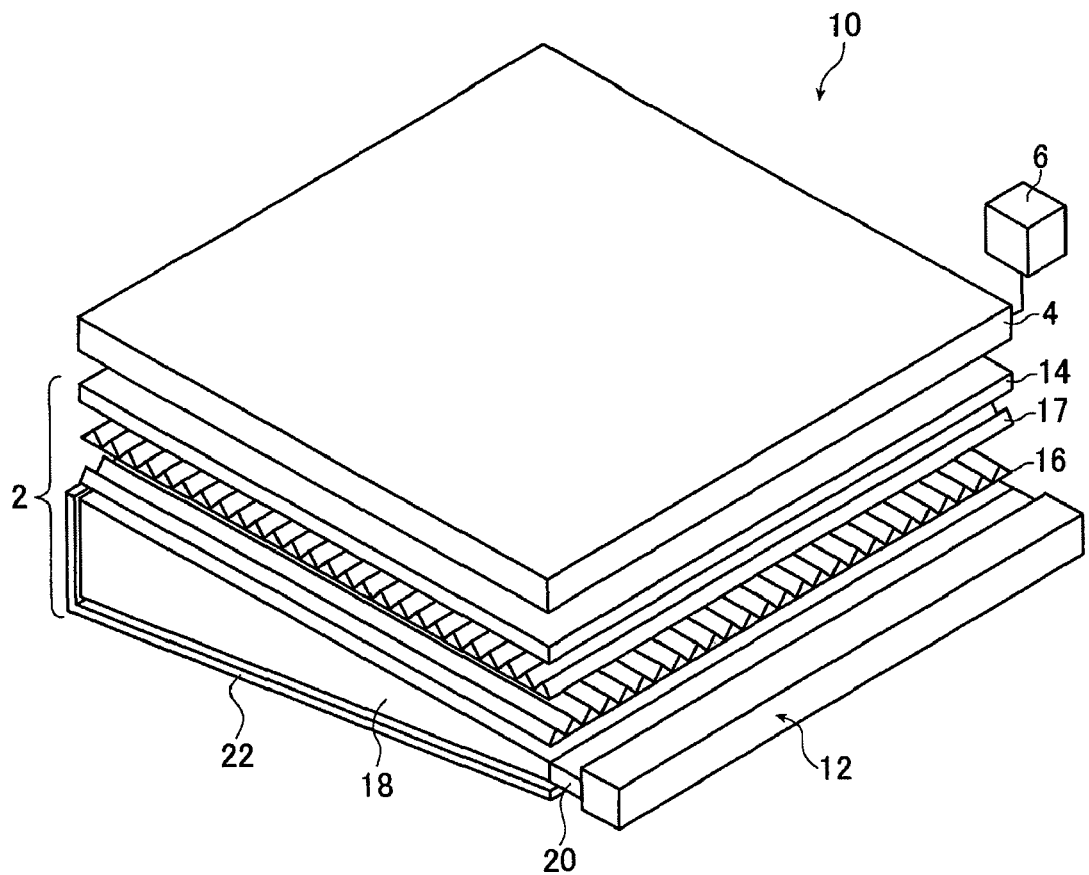
FIG. 1A is a schematic perspective view of an example of a liquid crystal display device provided with the planar lighting device according to a first embodiment of the present invention.

LEGEND 2, 60, 100, 140, 160: backlight units
4: liquid crystal display panel
6: drive unit
10: liquid crystal display device
12, 62, 142: light sources
14, 102: diffusion films
16, 17, 104, 106: prism sheets
18, 70, 80, 144: light guide plates
18$a$: light exit plane
18$b$, 70$a$: inclined planes
18$c$, 70$c$, 80$c$: light entrance planes
20: light mixer
22, 108: reflection sheets
24: LED array
25: LED chip
26: multilayered LED arrays
27: heat sink
28, 40: coupling lenses
30: RGB-LED
32: R-LED
34: G-LED
36: B-LED
42, 44, 46: ball lenses
64: cold cathode tube
66: reflector
70$b$: flat surface
80$a$: first inclined plane
80$b$: second inclined plane
120: diffusion reflectors
146: base material
148: low refractive index member
162: reflection member

BEST MODE FOR CARRYING OUT THE INVENTION

Now, a liquid crystal display device provided with the inventive planar lighting device will be described in detail based on the embodiments illustrated in the attached drawings.

Figure 1B:
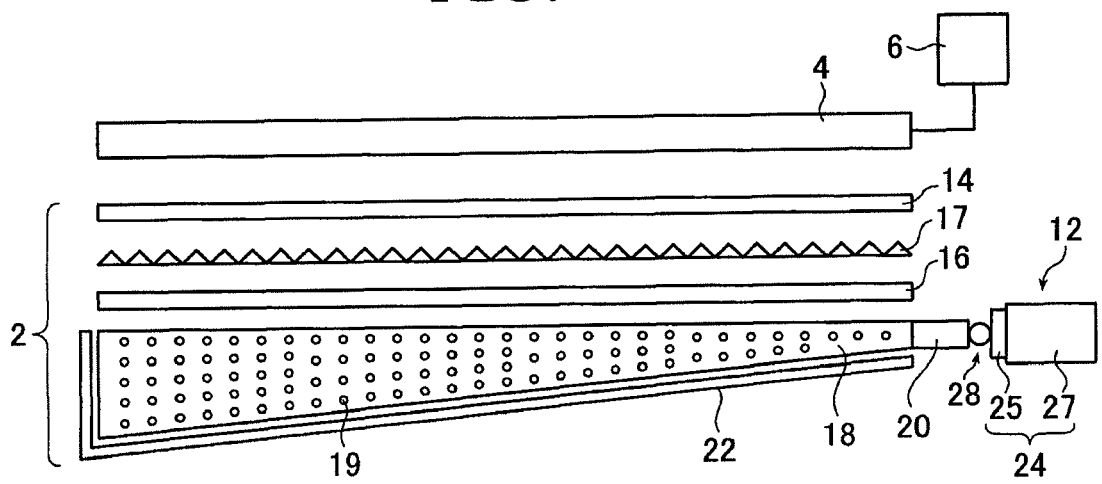
FIG. 1B is a schematic sectional view thereof.
Figure 2A:
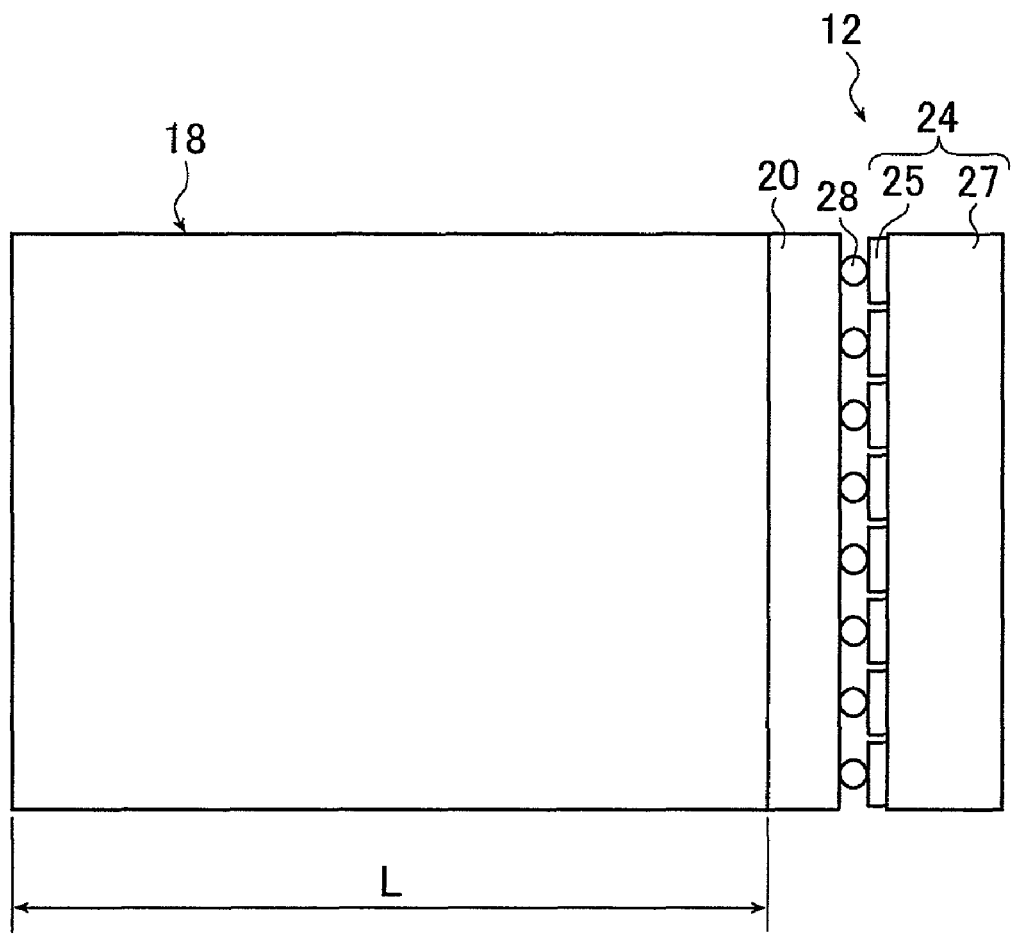
FIG. 2A is a schematic plan view of an example of the light guide plate and the light source used in the inventive planar lighting device.
Figure 2B:
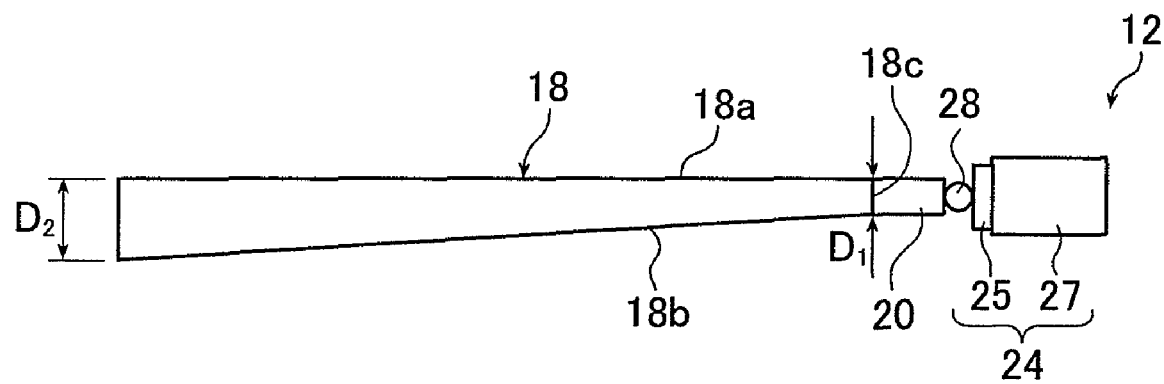
FIG. 2B is a schematic sectional view thereof.

FIG. 1A is a schematic perspective view of a liquid crystal display device provided with the planar lighting device according to the first embodiment of the present invention; FIG. 1B is a schematic sectional view of the liquid crystal display device. FIG. 2A is a schematic plan view of a light guide plate and a light source used in the inventive planar lighting device (hereinafter referred to as backlight unit); FIG. 2B is a schematic sectional view of the light guide plate.

A liquid crystal display device 10 comprises a backlight unit 2, a liquid crystal display panel 4 disposed on the side of the backlight unit closer to the light exit plane, and a drive unit 6 for driving the liquid crystal display panel 4.

In the liquid crystal display panel 4, electric field is partially applied to liquid crystal molecules previously arranged in a given direction to change the orientation of the molecules. The resultant changes in refractive index in the liquid crystal cells are used to display characters, figures, images, etc., on a surface of the liquid crystal display panel 4.

The drive unit 6 applies a voltage to transparent electrodes in the liquid crystal display panel 4 to change the orientation of the liquid crystal molecules, thereby controlling the transmittance of the light transmitted through the liquid crystal display panel 4.

The backlight unit 2 is a lighting device for irradiating the whole surface of the liquid crystal display panel 4 with light from behind the liquid crystal display panel 4 and comprises a light exit plane having substantially a same shape as the image display surface of the liquid crystal display panel 4.

As illustrated in FIGS. 1A, 1B, 2A and 2B, the backlight unit 2 according to the first embodiment of the present invention comprises a light source 12, a diffusion film 14, prism sheets 16 and 17, a light guide plate 18 as a light guide member, a light mixer (mixing zone) 20, and a reflection sheet 22. Now, individual components forming the backlight unit 2 will be described below.

First, the light source 12 will be described.

The light source 12 comprises an LED array 24 and coupling lenses 28 and are disposed, as illustrated in FIG. 2A, opposite to one side of the light guide plate 18.

Figure 3A:
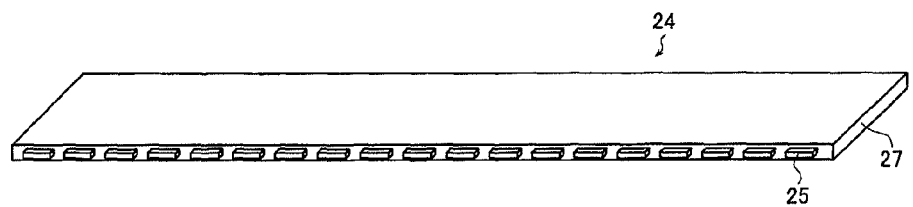
FIG. 3A is a schematic perspective view illustrating an example of a configuration of an LED array used in the present invention.
Figure 3B:
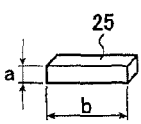
FIG. 3B is a schematic front view of an LED chip of the LED array illustrated in FIG. 3A.
Figure 3C:
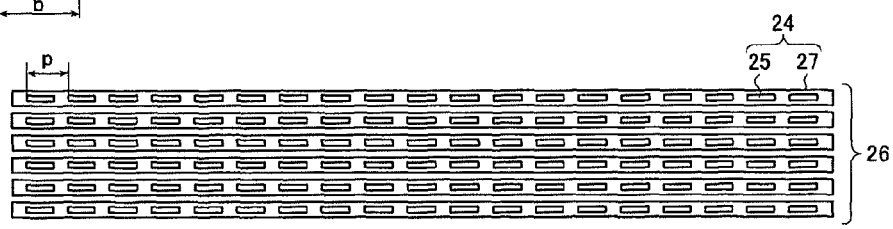
FIG. 3C is a schematic front view illustrating the configuration of multilayered LED arrays using the LED array of FIG. 3A.
Figure 3D:
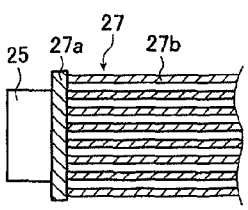
FIG. 3D is a schematic side view illustrating an embodiment of a heat sink.

The LED array 24 comprises a plurality of LED chips 25 arranged at preset pitches or given intervals in a row on the heat sink 27. FIG. 3A is a schematic perspective view of a configuration of the LED array 24; FIG. 3B is a schematic perspective view of the configuration of the LED chip 25; FIG. 3C is a schematic plan view of a configuration of multilayered LED arrays 26; and FIG. 3D is a schematic side view of an embodiment of the heat sink 27.

Each LED chip 25 is a monochromatic LED adapted to convert the light emitted by the LED into white light using a fluorescent substance. Where a GaN base blue LED is used as a monochromatic LED, for example, white light can be obtained using a YAG (yttrium aluminum garnet) base fluorescent substance.

The heat sink 27 is a sheet member parallel to one side of the light guide plate 18 and disposed opposite to the light guide plate 18. The heat sink 27 carries a plurality of LED chips 25 on a surface thereof facing the light guide plate 18. The heat sink 27 is formed of a metal having a good thermal conductivity such as copper or aluminum to absorb and release heat generated by the LED chips 25 to the outside.

The heat sink 27 preferably has a shape such that, as in the embodiment under discussion, the length thereof in the direction perpendicular to the plane thereof facing the light guide plate 18 is longer than the length of the plane thereof facing the light guide plate 18 in the direction of the shorter sides. This increases the efficiency with which the LED chips 25 are cooled.

The heat sink preferably has a large surface area. For example, the heat sink 27 may be configured for example by a base 27a carrying the LED chips 25 and a plurality of fins 27b joined to the base 27a as illustrated in FIG. 3D.

The plurality of fins 27b provided secure a large surface area and a high heat dissipation efficiency, increasing the efficiency with which the LED chips 25 are cooled.

The heat sink may be not only of air-cooled type but also of water-cooled type.

While the embodiment under discussion uses a heat sink as a support member for the LED chips, the present invention is not limited thereto: where the LED chips need not be cooled, a sheet member without a heat-releasing function may be used as the support member.

As illustrated in FIG. 3B, the LED chip 25 according to the embodiment under discussion has a rectangular shape such that the sides perpendicular to the direction in which the LED chips 25 are arrayed are shorter than the sides lying in the direction in which the LED chips 25 are arrayed or, in other words, the sides lying in the direction of thickness of the light guide plate 18 (the direction perpendicular to the light exit plane 18a) are the shorter sides. Expressed otherwise, the LED chip 25 has a shape satisfying b>a where "a" denotes the length of the sides perpendicular to the light exit plane 18a of the light guide plate 18 and "b" denotes the length of the sides in the direction of the array. Further, let "p" be a distance by which the arrayed LED chips 25 are spaced apart from one another, then p>b holds. Thus, the relationship between the length "a" of the sides of the LED chips 25 perpendicular to the light exit plane 18a of the light guide plate 18, the length "b" of the sides in the direction of the array, and the distance "p" of the LED chips 25 by which the arrayed LED chips 25 are spaced apart from one another preferably satisfies p>b>a.

The LED chips 25 each given a rectangular shape allows the thickness of the light source to be reduced while maintaining a great amount in which light is produced. A thinner light source, in turn, enables a thinner design of the planar lighting device to be achieved.

While the LED chips each preferably have a rectangular shape with the shorter sides lying in the direction of thickness of the light guide plate to achieve a thinner design of the LED array, the present invention is not limited thereto, allowing use of LED chips having any shape as appropriate such as a square, a circle, a polygon, and an ellipse.

While the LED array is monolayered in the embodiment under discussion, the present invention is not limited thereto; one may use multilayered LED arrays 26 comprising a plurality of LED arrays 24 stacked on each other for the light source as illustrated in FIG. 3C. Where the LEDs are thus stacked, more LED arrays can be stacked by adapting the LED chips to have a rectangular shape and the LED arrays each to have a reduced thickness. Where the LED arrays are stacked into a multilayer, that is to say, where more LED arrays (LED chips) are packed into a given space, an increased amount of light can be generated. Preferably, the above expression also applies to the distance separating the LED chips of an LED array from the LED chips of the LED arrays in adjacent layers. Expressed otherwise, the LED arrays preferably are stacked such that the LED chips are spaced a given distance apart from the LED chips of the LED arrays in adjacent layers.

As illustrated in FIGS. 1A, 1B, 2A and 2B, ball lenses are provided as coupling lenses 28 on the light emitting side of the respective LED chips 25 of the LED array 24. The coupling lenses 28 are allocated to the respective LED chips 25. Light emitted by the individual LED chips 25 is collimated by the coupling lenses 28 before entering the light mixer 20 of the light guide plate 18.

While ball lenses are used as coupling lenses here, no specific limitations are placed on the coupling lenses, provided that they are capable of collimating light emitted by the LEDs. One may use, for example, a cylindrical lens, a lenticular lens, a half-cylindrical lens, a Fresnel lens, and the like.

Next, the light guide plate 18 of the backlight unit 2 will be described.

As illustrated in FIG. 2A, the light guide plate 18 comprises a flat, substantially rectangular light exit plane 18a, an inclined plane 18b located on the side opposite from the light exit plane 18a and inclined a given angle with respect to the light exit plane 18a, a light entrance plane 18c located opposite to the LED array 24 and admitting light emitted by the LED array 24. The light exit plane 18a is parallel to the direction of the optical axis of the light emitted by the light source 12 and incident on the light entrance plane 18c whereas the inclined plane 18b is inclined with respect to the light exit plane 18a. The light guide plate 18 grows thicker (in the direction perpendicular to the light exit plane 18a) with the increasing distance from the light entrance plane 18c such that the light guide plate 18 is thinnest on the end portion thereof at which the light entrance plane 18c is located and thickest on the end portion thereof opposite from the light entrance plane 18c, i.e., on the end portion thereof opposite to the light entrance plane 18c, or expressed otherwise, on the end portion thereof located opposite from the light entrance plane 18c.

No specific limitations are placed on the angle by which the inclined plane 18b is inclined with respect to the light exit plane 18a.

The direction of the optical axis of the light emitted by the light source 12 and incident on the light entrance plane 18c (also referred to simply as "optical axis direction" below) is the central axis of the light incident on the light entrance plane 18c and perpendicular to the light entrance plane 18c in the embodiment under discussion.

In the light guide plate 18 illustrated in FIGS. 2A and 2B, light entering through the light entrance plane 18c is scattered by scatterers (scattering particles 19: described later in detail) contained inside the light guide plate 18 as light travels through the inside of the light guide plate 18 and, directly or after being reflected by the inclined plane 18b, exits through the inclined plane 18b but is then reflected by the reflection sheet (see Figs. 1A and 1B) so provided as to cover through the light exit plane 18a. Some light can in the process leak to the inclined plane 18b of the light guide plate 18 back into the light guide plate 18.

Thus, according to the invention, the light launched into the light guide plate 18 is allowed to travel farther by providing the inclined plane 18b opposite to the light exit plane 18a of the light guide plate 18 such that the thickness of the light guide plate 18 gradually increases with the increasing distance from the light entrance plane 18c. In addition, a thinner light guide plate can be achieved as compared with a flat light guide plate or a wedge-shaped light guide plate. In brief, the invention makes it possible to allow light to travel farther in the light guide plate and provide a light guide plate with a reduced thickness and weight. Specifically, the incident angle of totally reflected light gradually decreases, which reduces the ease with which light leaks to the outside through the light exit plane, thus allowing the launched light to reach deeper into the light guide plate. Thus, a planar lighting device with a reduced weight and thickness and increased dimensions can be achieved.

Further, a light guide plate with a reduced thickness can be flexible itself. Thus, the light guide plate, when used with a flexible liquid crystal, can be used to provide a flexible LCD monitor or a flexible television (TV).

Further, the light guide plate preferably contains scatterers inside. Where light is diffused in an appropriate manner by scatterers contained in the light guide plate to break the conditions of total reflection, the light guide plate itself assumes a function whereby light now difficult to emit is emitted such that light emitted through the light exit plane can be further uniformed. Otherwise than using the scatterers, uniform light may also be emitted, as where the scatterers are used, by adding transmittance adjustors on the side of the light guide plate closer to the light exit plane and properly adjusting the distribution density of the transmittance adjustors.

Now, let D1 be the thickness of the light guide plate where the light entrance plane is located (thickness where light enters) and D2 the thickness of the light guide plate where the plane located on the side opposite from the light entrance plane, i.e., the plane opposite to the light entrance plane, is located (thickness on the opposite side), and L the length of the light guide plate in the direction in which light travels inside the light guide plate (light guiding length). Then, the light guide plate preferably satisfies the following relationships:

$D1<D2$ and $$1/1000<(D2-D1)/(L/2)<1/10 \quad (A)$$

More preferably, the light guide plate satisfies the following relationships:

$D1<D2$ and $$27/100000<(D2-D1)/(L/2)<26/1000 \quad (B)$$

and a ratio Np of the weight of the contained scattering particles to the weight of the light guide plate satisfies a range:

$0.04\% \text{ Wt}<N_p<0.25\% \text{ Wt}.$

When the light guide plate satisfies the above relationships, the light emission efficiency can be further increased, say to 30% or more.

Still more preferably, the following relationships hold:

$D1<D2$ and $$66/100000<(D2-D1)/(L/2)<26/1000 \quad (C)$$

and the ratio Np of the weight of the contained scattering particles to the weight of the light guide plate satisfies a range:

$0.04\% \text{Wt}<Np<0.25\%\text{Wt}.$

When the light guide plate satisfies the above relationships, the light emission efficiency can be further increased, say to 40% or more.

When the light guide plate has a shape satisfying the above expressions, the thickness and weight of the light guide plate can be reduced and its dimensions increased in a more suitable manner, achieving a reduced thickness and weight and increased dimensions for the planar lighting device.

Further, a light guide plate available with a reduced thickness and weight can be made flexible itself and thus used in wall-mounted illumination devices or curtain illumination devices. Further, the flexible light guide plate makes feasible a flexible liquid crystal monitor or a flexible liquid crystal television.

The light guide plate 18 is formed of a transparent resin into which scattering particles for scattering light are kneaded and dispersed. Transparent resin materials that may be used to form the light guide plate 18 include optically transparent resins such as PET (polyethylene terephthalate), PP (polypropylene), PC (polycarbonate), PMMA (polymethyl methacrylate), benzyl methacrylate, MS resins, and COP (cycloolefin polymer). To form the scattering particles kneaded and dispersed into the light guide plate 18, one may use, for example, TOSPEARL (trademark), silicone, silica, zirconia, or a derivative polymer. The light guide plate 18 containing such scattering particles is capable of emitting uniform illumination light through the light exit plane with a reduced level of brightness unevenness.

The light guide plate 18 so formed may be manufactured using an extrusion molding method or an injection molding method.

Now, let $\Phi$ be the scattering cross section of the scattering particles contained in the light guide plate 18; $L_G$ the length of the light guide plate 18 in the direction in which light is launched or admitted from the light entrance plane to a position where the thickness of the light guide plate in the direction perpendicular to the light exit plane is greatest, the length $L_G$ being, in the embodiment under discussion, the length of the light guide plate in the direction in which light is launched (direction perpendicular to the light entrance plane 18c of the light guide plate 18; also referred to as "the optical axis direction" below); $N_p$ the density of the scattering particles contained in the light guide plate 18 (number of particles in unit volume); and $K_C$ a compensation coefficient. Then a relationship holds that the value $\Phi \cdot N_p \cdot L_G \cdot K_C$ is not less than 1.1 and not greater than 8.2, and that the compensation coefficient $K_C$ is not less than 0.005 and not greater than 0.1. The light guide plate 18, containing scattering particles satisfying the above relationship, is capable of emitting uniform illumination light through the light exit plane with a reduced level of brightness unevenness.

When parallel light beams are caused to enter an isotropic medium, a transmittance T is generally expressed according to the Lambert-Beer law by the following expression (1):

$$T = I/I_o = \exp(-\rho \cdot x) \quad (1)$$

where x is a distance, $I_o$ an intensity of incoming light, I an intensity of outgoing light, and $\rho$ an attenuation constant.

The above attenuation constant $\rho$ can be expressed using $\Phi$, the scattering cross section of particles and $N_p$, the number of particles in unit volume contained in the medium as follows:

$$\rho = \Phi \cdot N_p \quad (2)$$

Accordingly, a light extraction efficiency $E_{out}$ is expressed by the following expression (3) where $L_G$ is the length of the light guide plate in the direction of the optical axis. The length $L_G$ of the light guide plate in the direction of the optical axis is the length of the light guide plate 18 in the direction perpendicular to the light entrance plane from the light entrance plane of the light guide plate 18 to the plane opposite to the light entrance plane of the light guide plate 18, i.e., the length of the light guide plate from end face to end face in the optical axis direction.

The light extraction efficiency $E_{out}$ is a ratio of light reaching the position distanced from the light entrance plane of the light guide plate by the length $L_G$ in the direction of the optical axis to the incoming light. In the case of the light guide plate 18 illustrated in FIG. 2, for example, the light extraction efficiency $E_{out}$ is a ratio of light reaching the plane opposite to the light entrance plane of the light guide plate (distanced by the length of the light guide plate in the optical axis direction) to the light incident on the light entrance plane.

$$E_{out} \propto \exp(-\Phi \cdot N_p \cdot L_G) \quad (3)$$

The expression (3) applies to a space of limited dimensions. To correct the relationship with the expression (1), the compensation coefficient $K_C$ is therein introduced. The compensation coefficient $K_C$ is a dimensionless compensation coefficient empirically obtained where light propagates through an optical medium of limited dimensions. The light extraction efficiency $E_{out}$ is then expressed by the following expression (4).

$$E_{out} = \exp(-\Phi \cdot N_p \cdot L_G \cdot K_C) \quad (4)$$

According to the expression (4), when $\Phi \cdot N_p \cdot L_G \cdot K_C$ is 3.5, the light extraction efficiency $E_{out}$ is 3%; When $\Phi \cdot N_p \cdot L_G \cdot K_C$ is 4.7, the light extraction efficiency $E_{out}$ is 1%.

The results show that the light extraction efficiency $E_{out}$ decreases as $\Phi \cdot N_p \cdot L_G \cdot K_C$ increases. It is assumed that the light extraction efficiency $E_{out}$ thus decreases because light is scattered increasingly as it travels in the direction of the optical axis of the light guide plate.

It follows, therefore, that the greater the value $\Phi \cdot N_p \cdot L_G \cdot K_C$ is, the more preferable it is as a property of the light guide plate. To be more specific, when $\Phi \cdot N_p \cdot L_G \cdot K_C$ is great, light exiting through the plane opposite to the light entrance plane can be reduced whereas light emitted through the light exit plane can be increased. Expressed otherwise, when $\Phi \cdot N_p \cdot L_G \cdot K_C$ is great, the ratio of the light emitted through the light exit plane to the light incident on the light entrance plane can be increased (that ratio being also referred to as "light use efficiency" below). Specifically, a light use efficiency as high as 50% or more is achieved when $\Phi \cdot N_p \cdot L_G \cdot K_C$ is 1.1 or greater.

While light emitted through the light exit plane 18a of the light guide plate 18 increasingly exhibits illuminance unevenness as $\Phi \cdot N_p \cdot L_G \cdot K_C$ increases, the illuminance unevenness can be held to under a given level (within a tolerable range) by holding the value $\Phi \cdot N_p \cdot L_G \cdot K_C$ to 8.2 or less. Note that illuminance and brightness can be treated substantially equally. Thus, it is assumed that brightness and illuminance possess similar tendencies in the present invention.

Thus, the value $\Phi \cdot N_p \cdot L_G \cdot K_C$ of the inventive light guide plate preferably satisfies a relationship that it is not less than 1.1 and not greater than 8.2, and more preferably not less than 2.0 and not greater than 7.0. Still more preferably, the value $\Phi \cdot N_p \cdot L_G \cdot K_C$ is not less than 3.0 and, most preferably, not less than 4.7.

The compensation coefficient $K_C$ is preferably not less than 0.005 and not greater than 0.1.

Given $\Phi \cdot N_P \cdot L_G \cdot K_C$ of 1.1 or more, a high light use efficiency, specifically 50% or more, is achieved whereas given $\Phi \cdot N_P \cdot L_G \cdot K_C$ of 8.2 or less, illuminance unevenness can be held to 150% or less.

It is also shown that given $K_C$ of 0.005 or more, a high light use efficiency is achieved, and given $K_C$ of 0.1 or less, illuminance unevenness observed in light emitted from the light guide plate can be reduced to a low level.

Increasing the particle density or, consequently, increasing $\Phi \cdot N_P \cdot L_G \cdot K_C$, results in an enhanced light use efficiency but then illuminance unevenness also increases. It is also shown that reducing the particle density or, consequently, reducing $\Phi \cdot N_P \cdot L_G \cdot K_C$, results in a lowered light use efficiency but then illuminance unevenness decreases.

Thus, the value of $\Phi \cdot N_P \cdot L_G \cdot K_C$ not less than 1.1 and not greater than 8.2 yields a light use efficiency of 50% or more and illuminance unevenness of 150% or less. Illuminance unevenness, when reduced to 150% or less, can be made inconspicuous.

Thus, it will be understood that $\Phi \cdot N_p \cdot L_G \cdot K_C$ of not less than 1.1 and not greater than 8.2 yields light use efficiency above a certain level and a reduced illuminance unevenness.

In the light guide unit 18, at least one surface of the light entrance plane 18c, through which light is admitted, the light exit plane 18a, and the inclined plane 18b, which reflects light, preferably has a surface roughness Ra of smaller than 380 nm, thus, Ra<380 nm.

When the light entrance plane 18c is given a surface roughness Ra of smaller than 380 nm, diffuse reflection on the surface of the light guide unit can be ignored or, in other words, diffuse reflection on the surface of the light guide unit can be prevented and, thus, light admission efficiency can be improved.

Further, when the light exit plane 18a is given a surface roughness Ra of smaller than 380 nm, transmission by diffuse reflection through the surface of the light guide unit can be ignored or, in other words, transmission by diffuse reflection on the surface of the light guide unit can be prevented and, therefore, light is allowed to travel further deep into the light guide unit by total reflection.

Further, when the inclined plane 18b, a light reflecting plane, is given a surface roughness Ra of smaller than 380 nm, diffuse reflection can be ignored or, in other words, diffuse reflection on the light reflecting plane can be prevented and, therefore, the totally reflected light components are allowed to travel further deep into the light guide unit.

Figure 26A:
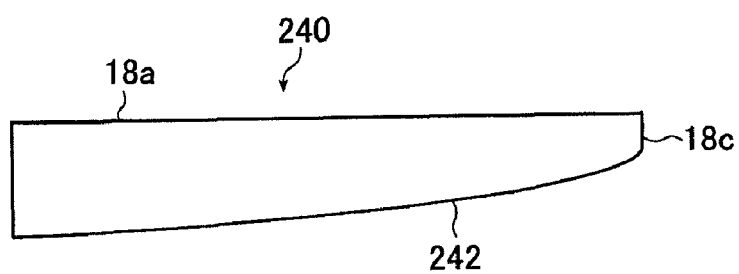
FIGS. 26A and 26B are schematic sectional views illustrating other examples of the light guide plate.
Figure 26B:
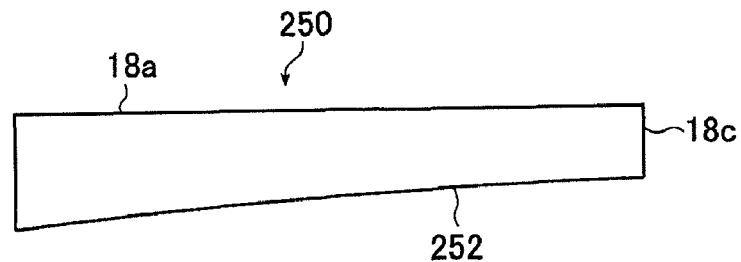

While, in the embodiment under discussion, the plane of the light guide plate opposite to the light exit plane is an inclined plane inclined with respect to the light exit plane, the present invention is not limited thereto; the light guide plate may have any shape, provided that the light guide plate is thicker at the plane opposite to the light entrance plane than at the light entrance plane. For example, the plane of the light guide plate opposite to the light exit plane, i.e., the inclined plane 18b, may be a curved surface. Where the inclined plane is a curved plane, it may be the curved surface 242 curved outward with respect to the light exit plane, as a light guide plate 240 shown in FIG. 26A or the curved surface 252 curved inward with respect to the light exit plane, as a light guide plate 250 shown in FIG. 26B.

Now, examples of preferred shapes of the light guide plate will be described referring to FIG. 4 below.

FIGS. 4A to 4D are schematic sectional views illustrating other examples of the light guide plate.

Figure 4A:
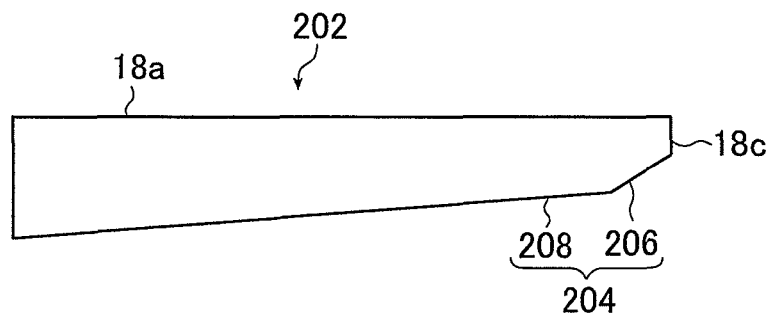
FIGS. 4A to 4D are schematic sectional views illustrating other examples of the light guide plate.

In a light guide plate 202 of FIG. 4A, an inclined plane 204 comprises a first inclined portion 206 located closer to the light entrance plane 18c and a second inclined portion 208 located closer to the plane opposite to the light entrance plane 18c. The first inclined portion 206 and the second inclined portion 208 are inclined by different angles from each other with respect to the light exit plane such that the inclination angle of the first inclined portion 208 is smaller than the inclination angle of the second inclined portion 206. Expressed otherwise, the inclined plane is formed with a plurality of inclined portions of which the inclination angles become gentler with the increasing distance form the light entrance plane 18c or, expressed otherwise, is formed with a plurality of inclined portions of which the inclination angles become greater with the decreasing distance to the light entrance plane 18c.

Thus, where the inclined plane has a cross section perpendicular to the light exit plane and to the light entrance plane defined by a plurality of straight lines having different inclination angles such that the inclination angles of the inclined portions located closer to the light entrance plane are greater, the increase in brightness of light emitted in an area of the light exit plane near the light entrance plane can be prevented. This enables more uniform light to be emitted through the light exit plane.

While each inclined plane consists of two inclined portions in FIG. 4A, the number of inclined portions forming the inclined plane is not limited specifically; each inclined plane may be composed of any number of inclined portions, provided that the inclination angle grows gradually smaller with the increasing distance from the light entrance plane.

Figure 4B:
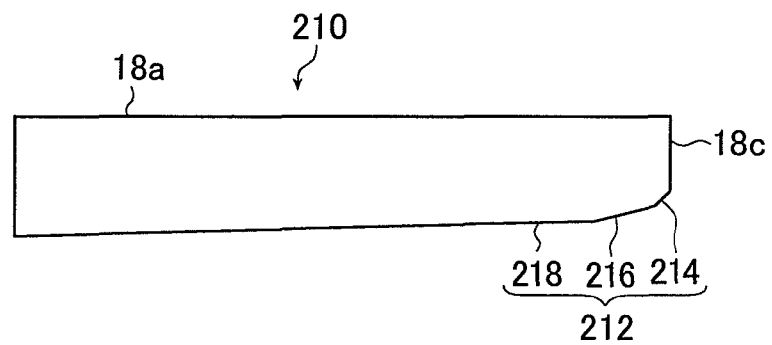

As illustrated in FIG. 4B, for example, an inclined plane 212 of a light guide plate 210 may be formed with three inclined portions: a first inclined portion 214, a second inclined portion 216 having a gentler inclination angle than the first inclined portion 214, and a third inclined portion 218 having a gentler inclination angle than the second inclined portion 216, arranged in this order as seen from the side closer to the light entrance plane 18c toward the plane opposite to the light entrance plane 18c.

Figure 4C:
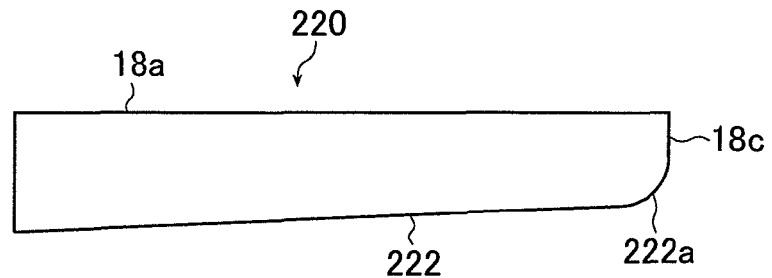

Next, a light guide plate 220 illustrated in FIG. 4C comprises a curved surface portion 222a having a rounded shape on the side of an inclined plane 222 closer to the light entrance plane 18c, i.e., at the joint between the inclined plane 222 and the light entrance plane 18c.

Thus, the increase in brightness of light emitted in an area of the light exit plane near the light entrance plane can be prevented also by the configuration where a curved surface having a rounded portion is provided at the joint between the inclined plane and the light entrance plane such that the light entrance plane and the inclined plane represent a shape smoothly connecting each other.

Figure 4D:
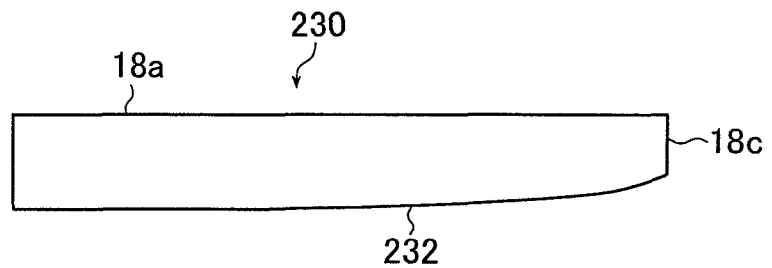

Next, a light guide plate 232 illustrated in FIG. 4D has an inclined plane 232 formed into an aspherical shape that may be expressed by a 10-th order polynomial.

Thus, the increase in brightness of light emitted in an area of the light exit plane near the light entrance plane can be prevented also by forming the inclined plane into an aspherical shape.

The light guide plate may be made by mixing a plasticizer into the transparent resin described earlier.

The light guide plate made of a transparent material mixed with a plasticizer is given a flexibility, or a pliability such that the light guide plate can be formed into various shapes. Thus, the surface of the light guide plate can be formed into various curved planes.

Therefore, in cases where, for example, the light guide plate or a planar lighting device using the light guide plate is used as a display board employing ornamental lighting (illuminations), it can also be mounted to a wall having a curvature. Thus, the light guide plate can be used for a wider variety of applications and in a wider application range including ornamental lighting and POP (point-of-purchase) advertising.

Said plasticizer is exemplified by phthalic acid esters, or, specifically, dimethyl phthalate, diethyl phthalate (DEP), dibutyl phthalate (DBP), di(2-ethylhexyl) phthalate (DOP (DEHP)), di-n-octyl phthalate (DnOP), diisononyl phthalate (DINP), dinonyl phthalate (DNP), diisodecyl phthalate (DIDP), phthalate mixed-base ester ($C_6$ to $C_{11}$) (610P, 711P, etc.) and butyl benzyl phthalate (BBP). Besides phthalic acid esters, said plasticizer is also exemplified by dioctyl adipate (DOA), diisononyl adipate (DINA), dinormal alkyl adipate ($C_{6,8,10}$) (610A), dialkyl adipate ($C_{7,9}$) (79A), dioctyl azelate (DOZ), dibutyl sebacate (DBS), dioctyl sebacate (DOS), tricresyl phosphate (TCP), tributyl acetylcitrate (ATBC), epoxidized soybean oil (ESBO), trioctyl trimellitate (TOTM), polyesters and chlorinated paraffins.

As illustrated in FIGS. 1A, 1B, 2A and 2B, the backlight unit 2 according to the embodiment under discussion has a light mixer 20 provided in close contact with the light entrance plane 18c of the light guide plate 18. The light mixer 20 is a columnar optical member formed of a transparent resin containing light scattering particles mixed therein and has a function to mix incoming light launched through the coupling lenses 28. The light mixer 20 may basically be formed of a same material as the light guide plate 18 and may contain therein scatterers for scattering light. The density and some other conditions of the scatterers contained in the light mixer 20 may be identical to or different from those of the scatters contained in the light guide plate 18. The light mixer 20, located close to the LED array 24 as illustrated in FIGS. 2A and 2B, is preferably formed of a material having a great heat resistance.

Next, the diffusion film 14 will be described.

As illustrated in FIGS. 1A and 1B, the diffusion film 14 is disposed between the prism sheet 17 and the liquid crystal display panel 4. The diffusion film 14 is formed by imparting a light diffusing property to a material in the form of film. The material in the form of film may be formed, for example, of an optically transparent resin such as PET (polyethylene terephthalate), PP (polypropylene), PC (polycarbonate), PMMA (polymethyl methacrylate), benzyl methacrylate, an MS resin, or COP (cycloolefin polymer).

The method of manufacturing the diffusion film 14 is not limited specifically. For example, a surface of the material in the form of film may be machined to form an asperity thereon or roughened by grinding thereby to provide a light diffusing property, or by coating the surface with a material that diffuses light as exemplified by silica; pigments such as titanium oxide and zinc oxide; a resin; and beads of glass, zirconia, etc., together with a binder, or by kneading the above pigments or beads having a light diffusing property into said transparent resin. Otherwise, one may also use a material having a high reflectance and a low light-absorbing property such as metals as exemplified by Ag and Al.

In the present invention, a diffusion film of a matte type or a coating type may be used as the diffusion film 14.

The diffusion film 14 may be disposed a given distance apart from the light exit plane 18a of the light guide plate 18. The distance may be altered as appropriate according to the light amount distribution of light emitted through the light exit plane 18a of the light guide plate 18.

With the diffusion film 14 spaced a given distance apart from the light exit plane 18a of the light guide plate 18, the light emitted through the light exit plane 18a of the light guide plate 18 is further mixed (blended) between the light exit plane 18a and the diffusion film 14. This further enhances the uniformity of brightness of the light transmitted through the diffusion film 14 to illuminate the liquid crystal display panel 4.

The diffusion film 14 may be spaced a given distance apart from the light exit plane 18a of the light guide plate 18 by a method using, for example, spacers provided between the diffusion film 14 and the light guide plate 18.

The prism sheets 16 and 17 are transparent sheets formed with prisms arranged parallel to one another and help condense light emitted through the light exit plane 18a of the light guide plate 18 to improve brightness. One of the two prism sheets 16 and 17 is disposed such that the prism arrays thereof extend parallel to the light entrance plane 18c of the light guide plate 18; the other is disposed with the prism arrays extending perpendicular thereto. Thus, the two prism sheets 16 and 17 are disposed such that their respective prism arrays extend perpendicular to each other. Further, the prism sheet 16 is preferably disposed such that the vertexes of the prisms face the diffusion sheet 14, with the bases of the prisms facing the light exit plane 18a of the light guide plate 18. As regards the order in which the prism sheets are disposed, one may dispose the prism sheet 16 having prisms extending parallel to the light entrance plane 18c of the light guide plate 18 immediately on the light guide plate while disposing on the prism sheet 16 the prism sheet 17 having prisms extending perpendicular to the light entrance plane 18c of the light guide plate 18, or the order may be reversed.

While the illustrated example uses the prism sheets, a sheet on which optical elements similar to prisms are arranged regularly may be used instead of the prism sheets. One may also use a sheet on which optical elements having lens effects such as lenticular lenses, concave lenses, convex lenses, or pyramid-shaped lenses are arranged regularly instead of the prism sheet.

Alternatively, a plurality of diffusion films may be used without using the prism sheet. Then, two or more, preferably three diffusion films are used.

Next, the reflection sheet 22 of the backlight unit will be described.

The reflection sheet 22 is provided to reflect light leaking through the inclined plane 18b and the plane opposite to the light entrance plane 18c of the light guide plate 18 (the plane farthest from the light entrance plane 18c in the optical axis direction) back into the light guide plate 18, thereby enhancing the light use efficiency. The reflection sheet 22 is so formed as to cover the inclined plane 18b and the plane opposite to the light entrance plane 18c of the light guide plate 18. Expressed otherwise, the reflection sheet 22 is disposed so as to face the plane opposite to the light entrance plane 18c and the inclined plane 18b.

The reflection sheet 22 may be formed of any material that is capable of reflecting light leaking through the inclined plane 18b and the plane opposite to the light entrance plane 18c of the light guide plate 18. It may be formed, for example, of a resin sheet formed by kneading PET, PP (polypropylene), etc. with a filler and then drawing a resultant mixture to form voids therein thereby to increase the reflectance; a sheet formed by depositing aluminum vapor or otherwise forming a specular surface on the surface of a transparent resin sheet or a white resin sheet; a metal foil such as an aluminum foil or a resin sheet carrying a metal foil; and a metal thin plate having sufficient reflective property on the surface.

While the components of the backlight unit 2 according to the first embodiment of the invention have been described above in detail, the present invention is not limited thereto.

For example, while the embodiment under discussion uses a light source combining blue LEDs and a YAG base fluorescent substance, the present invention is not limited thereto; the light source may use blue LEDs combined with a red-green fluorescent substance other than a YAG base fluorescent substance. Specifically, one may use a fluorescent element as described in JP 2005-228996 A where the LEDs are used with a fluorescent substance.

Alternatively, one may use a light source where red LEDs are combined with red, green, and blue fluorescent substances. Examples of such light source include a light emitting device where an LED is used with a fluorescent substance as described in JP 2000-347691 A, a white light emitting diode where an LED is used with a fluorescent substance as described in JP 2002-43633 A, and a light emitting device where an LED is used with a fluorescent substance as described in JP 2005-126577 A.

Further, the present invention is not limited to providing a fluorescent substance opposite to the light emission face of an LED to radiate white light; emission of white light through the light exit plane may also be achieved by mixing a fluorescent substance into the light guide plate instead of providing a fluorescent substance opposite to the light emission face of an LED.

One may alternatively use a configuration where an optical sheet having a fluorescent substance applied thereto or mixed therein is disposed on the light exit plane of the light guide plate. Emission of white light through the light exit plane may also be achieved with the above configuration.

While LEDs used in the above embodiment are of a type emitting white light, the present invention is not limited thereto. For example, three kinds of LEDs, i.e., a red LED, a green LED, and a blue LED, may be used, and light beams emitted by the individual LEDs may be blended using a coupling lens to produce white light.

Now, an example of a light source using three colors of LEDs will be described below. FIG. 5 is a schematic view illustrating a configuration of the light source using three colors of LEDs.

A light source 13 comprises an LED array 29 and coupling lenses 40.

The LED array 29 is configured by a plurality of RGB-LEDs 30 arranged in a row, each RGB-LED 30 being formed using three different light emitting diodes, i.e., red, green, and blue light emitting diodes (each referred to as R-LED 32, G-LED 34, and B-LED 36 below). FIG. 5 schematically illustrates how the plurality of RGB-LEDs 30 are arranged. The R-LED 32, the G-LED 34, and the B-LED 36 are regularly arranged as illustrated in FIG. 5.

Figure 6:
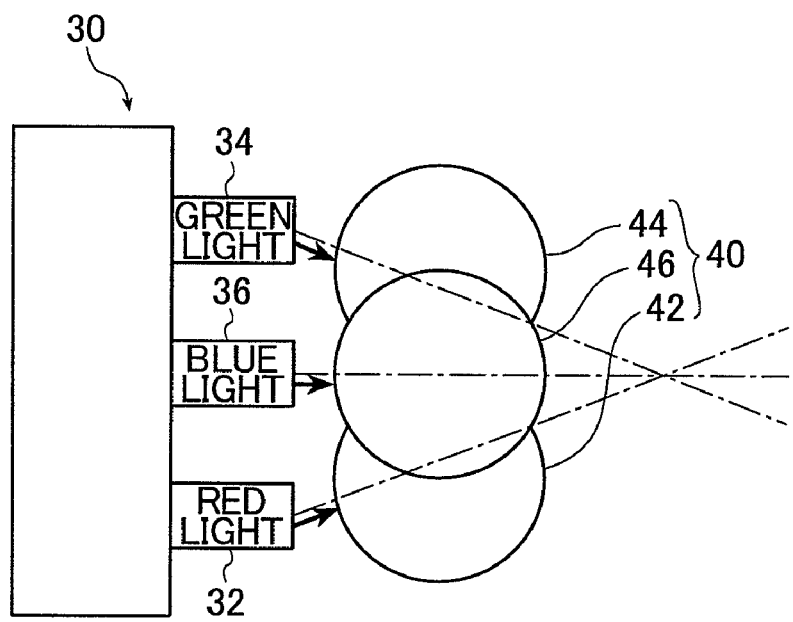
FIG. 6 is a schematic view of RGB-LEDs and coupling lenses.

In each RGB-LED 30, the directions of the optical axes of the three kinds of LEDs (the R-LED 32, the G-LED 34, and the B-LED 36) are adjusted as illustrated in FIG. 6 such that light beams leaving the R-LED 32, the G-LED 34, and the B-LED 36 cross one another at a given position. Thus, the three kinds of LEDs are adjusted such that the light beams from the LEDs are mixed to become white light.

The RGB-LED 30 configured using LEDs representing three primary colors (the R-LED 32, the G-LED 34, and the B-LED 36) achieves a wide range of color reproduction and a high color purity as compared with cold cathode tubes (CCFL) conventionally used as light source for backlight. Therefore, where the RGB-LED 30 is used as light source for backlight, color reproduction is improved over the prior art and images can be displayed in vivid color representation.

As illustrated in FIGS. 5 and 6, three ball lenses 42, 44, and 46 are disposed as coupling lens 40 on the light emitting side of the individual LEDs of the RGB-LED 30. The ball lenses 42, 44, and 46 are disposed for the respective LEDs. Specifically, three ball lenses 42, 44, and 46 are allotted to one RGB-LED 30. Light beams leaving the LEDs (the R-LED 32, the G-LED 34, and the B-LED 36) are each collimated by the ball lenses 42, 44, and 46. The light beams then cross one another at a given position to become white light and enter a light mixer 20 of the light guide plate 18. The coupling lens composed of the three ball lenses 42, 44, and 46 is a lens having three axes, whereby light beams leaving the LEDs of the RGB-LED can be mixed such that said light beams meet at one point.

While ball lenses are used as coupling lens in the example under discussion, no specific limitations are placed thereon, provided that the coupling lens is capable of collimating the light beams emitted by the LEDs. One may use, for example, cylindrical lenses, lenticular lenses, half-cylindrical lenses, Fresnel lenses, etc., to form the coupling lens.

Instead of providing the LED array opposite to the light entrance plane 18c of the light guide plate 18, light guides may be used to lead light emitted by the LEDs or the LED chips of the LED array to the light guide plate. The light guides may be formed, for example, of optical fibers or light guide paths made of a transparent resin.

Where the LED array is used as light source and located close to a lateral plane of the light guide plate 18, heat generated by the LEDs forming the LED array may possibly deform or melt the light guide unit 18. Deformation and melting of the light guide 18 due to the heat generated by the LEDs, however, can be prevented by locating the LED array away from the lateral plane of the light guide plate 18 and leading light emitted by the LEDs to the light guide plate 18 through the light guides.

While the light source in the above embodiment uses LEDs, the present invention is not limited thereto; a semiconductor laser (LD) may for example be used as well as LEDs.

Further, various types of light source may be sued such as a fluorescent tube, a cold cathode tube, a hot cathode tube, and an external electrode tube.

Now, an example of a light source using a cold cathode tube will be described.

Figure 7:
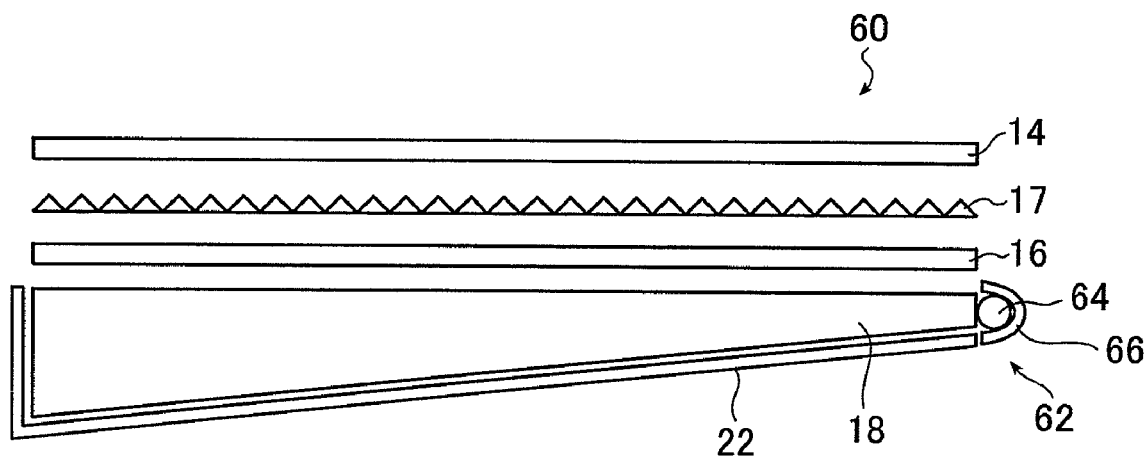
FIG. 7 is a schematic view of an example of the planar lighting device using a cold cathode tube as the light source.

FIG. 7 is a schematic view illustrating a configuration of a planar lighting device 60 using a cold cathode tube 64 as a light source 62.

Since the planar lighting device 60 illustrated in FIG. 7 has substantially the same configuration as the planar lighting device 10 illustrated in FIG. 1 except for the configuration of the light source, description of the identical components will not be given here, focusing instead upon the components not shared by the latter.

The light source 62 comprises a cold cathode tube (CCFL) 64 and a reflector 66.

The cold cathode tube 64 is in the form of a bar having a small diameter and used to illuminate the liquid crystal display panel 4. The cold cathode tube 64 is disposed opposite to the light entrance plane 18c of the light guide plate 18 and connected to the drive unit 6.

The reflector 66 is so disposed as to cover the part of the cold cathode tube 64 except the part opposite to the light entrance plane 18c. In other words, the periphery of the cold cathode tube 64 is covered with the reflector 66 and the light entrance plane 18c of the light guide plate 18. The reflector 66 is capable of causing light of the cold cathode tube 64 otherwise failing to enter the light guide plate 18 to be incident on the light entrance plane 18c of the light guide plate 18.

The reflector 66 may be formed of the same material as the above-described reflection sheet 22, namely, a resin material, a metal foil or a metal plate provided with sufficient reflective property on the surface.

Thus, also where the light source uses a cold cathode tube, the above light guide plate allows admitted light to reach a farther position.

While, in the above embodiment, the heat sink of the LED array is shaped like a flat plate and disposed on the rear side of the LED chips to extend parallel to the light exit plane, it may alternatively be formed into a bent shape like a letter L, for example, in such a manner as to extend from behind the LED chips toward the inclined plane of the light guide plate, i.e., over the rear side of the reflection member. This serves to reduce the area of the planar lighting device lying in the direction parallel to the light exit plane.

Where the heat sink is formed into a bent shape and disposed on the side of the light guide plate closer to the inclined plane, the heat sink preferably has a thickness and/or a length that does not affect the thickness of the backlight unit. Where the heat sink is made thinner than a maximum thickness and a minimum thickness of the light guide plate and disposed on the rear side of the inclined plane, the space between the inclined plane of the light guide plate and a housing can be used efficiently, and the thickness of the planar lighting device can be reduced.

The heat sink may be formed of a material having a high thermal conductivity such as, for example, aluminum or copper, as described earlier as well as various other materials.

Preferably, the heat sink thermally communicates with the housing, which supports the light guide plate, the reflection members, the LED array, and the like from the outside. Where the heat sink thermally communicates with the housing, heat generated by the LED chips can be released from the whole backlight unit (planar lighting device).

The heat sink and the housing need not necessarily be in immediate contact with each other; they may be in contact with each other by the intermediate of a thermal connector.

While the example illustrated in FIGS. 1A, 1B, 2A, and 2B has two prism sheets, one prism sheet may be used.

Further, while the prism sheets having prism arrays formed thereon are disposed on the light exit plane 18a in that example, like effects may be obtained by forming prism arrays on the inclined plane 18b of the light guide plate 18. In other words, prism arrays formed on the inclined plane also helps condense the light emitted through the light exit plane 18a to improve brightness.

Further, instead of such prism arrays, optical elements similar to prisms may be provided and arranged regularly. For example, lenticular lenses, concave lenses, convex lenses, or an optical element in pyramidal shape having lens effects may be formed on the inclined plane of the light guide plate.

Figure 8:
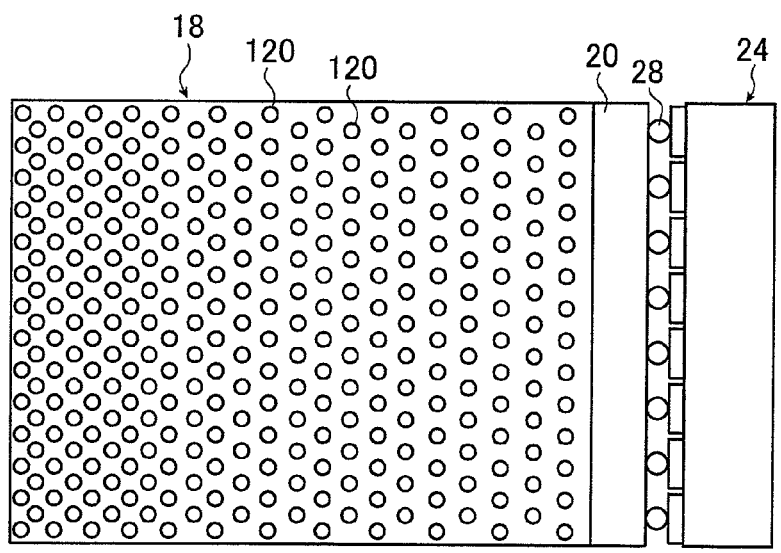
FIG. 8 is a schematic plan view of the planar lighting device provided with a light guide plate having diffusion reflectors printed on an inclined plane.

Further, as illustrated in FIG. 8, a plurality of diffusion reflectors 120 may be formed, by printing for example, on the inclined plane 18b of the light guide plate 18 in a given pattern, specifically in such a pattern that the density is low on the side of the light guide plate 18 closer to the light entrance plane 18c, growing gradually higher from the light entrance plane 18c toward the plane opposite to the light entrance plane 18c. Such diffusion reflectors 120 formed on the inclined plane 18b of the light guide plate 18 in a given pattern limit generation of bright lines or unevenness in the light exit plane 18a of the light guide plate 18. Further, instead of printing the diffusion reflectors 120 on the inclined plane 18b of the light guide plate 18, a thin sheet having the diffusion reflectors 120 formed thereon in a given pattern may be disposed between the inclined plane 18b of the light guide plate 18 and the reflection sheet 22. The diffusion reflectors 120 may each have any shape such as a rectangle, a polygon, a circle, and an ellipse.

The diffusion reflectors may be formed, for example, by applying a material for diffusing light as exemplified by silica; pigments such as titanium oxide and zinc oxide; a resin; and beads of glass, zirconia, etc., together with a binder, or may be a pattern created by machining the surface to form an asperity thereon or by grinding to roughen the surface. Otherwise, one may use a material having a high reflectance and a low light-absorbing property such as metals as exemplified by Ag and Al. One may also use ordinary white ink as used in screen printing, offset printing, etc., to form diffusion reflectors. One may use, for example, ink obtained by dispersing titanium oxide, zinc oxide, zinc sulfate, barium sulfate, or the like into acrylic binder, polyester binder, vinyl chloride binder, or the like; or ink given a diffusing property by mixing titanium oxide with silica.

While the diffusion reflectors are distributed at a density that increases with the increasing distance from the light entrance plane in the embodiment under discussion, the present invention is not limited thereto and may be determined as appropriate according to the intensity or distribution of bright lines, brightness distribution required of emitted light, etc. The diffusion reflectors, for example, may be distributed evenly on the whole surface of the inclined planes or at a density that decreases with the increasing distance from the light entrance plane. Further, instead of providing the diffusion reflectors by printing, the locations corresponding to the diffusion reflectors may be roughened to provide sand-rubbed surfaces.

While the diffusion reflectors are provided on the inclined plane in the light guide plate of FIG. 8, the present invention is not limited thereto; the diffusion reflectors may be provided on any plane as desired except the light entrance plane. For example, the diffusion reflectors may be provided on the light exit plane or on the inclined plane and the plane opposite to the light entrance plane.

Preferably, a chromaticity adjusting film formed of a transparent film having on its surface white ink that is mixed with and dispersed into ink of any color (other than white ink) is provided on the light exit plane of the light guide plate. The mixing ratio of ink of any color to white ink is less than 1 of ink of any color to 100 of white ink.

The chromaticity adjusting film provided enables the color of emitted light to be finely adjusted, improving color rendition and color reproduction. Thus, color rendition can also be improved where the light source used can only offer poor color rendition. Further, the color of emitted light can be fine-tuned.

Now, description will be made in more detail referring to specific examples.

In the examples now to be described, three different light sources were used: a cold cathode tube (CCFL) having a color temperature of 3500 K, an LED element having a color temperature of 9150 K, and an LED element having a color temperature of 8500 K. Measured were the chromaticity of light emitted without using the chromaticity adjusting film and the chromaticity of light emitted using chromaticity adjusting films with different ink mixing ratios given in Tables 1 and 2 below.

TABLE 1

| No. | white ink | violet | trichromatic magenta | magenta | trichromatic cyan |
|---|---|---|---|---|---|
| S0  | 500  | 0.0 | 0.0 | 0.0 | 0.0 |
| S1  | 500  | 1.5 | 0.0 | 0.0 | 0.0 |
| S2  | 500  | 3.0 | 0.0 | 0.0 | 0.0 |
| S3  | 500  | 0.0 | 1.5 | 0.0 | 0.0 |
| S4  | 500  | 0.0 | 3.0 | 0.0 | 0.0 |
| S5  | 500  | 0.0 | 0.0 | 1.5 | 0.0 |
| S6  | 500  | 0.0 | 0.0 | 3.0 | 0.0 |
| S7  | 500  | 0.0 | 0.0 | 0.0 | 1.5 |
| S8  | 500  | 0.0 | 0.0 | 0.0 | 3.0 |
| S9  | 260  | 1.5 | 0.0 | 0.0 | 1.0 |
| S10 | 520  | 1.5 | 0.0 | 0.0 | 1.0 |
| S11 | 1040 | 1.5 | 0.0 | 0.0 | 1.0 |
| S12 | 1166 | 1.0 | 0.0 | 0.0 | 2.4 |
| S13 | 875  | 1.0 | 0.0 | 0.0 | 2.3 |
| S14 | 438  | 1.0 | 0.0 | 0.0 | 2.3 |
| S15 | 1750 | 1.0 | 0.0 | 0.0 | 2.3 |

TABLE 2

| No. | white, highly concentrated 4707M | indigo 4746M | magenta FIL135TC |
|---|---|---|---|
| A0  | 500 | 0.0 | 0.0 |
| A14 | 900 | 1.5 | 1.5 |

Figure 9:
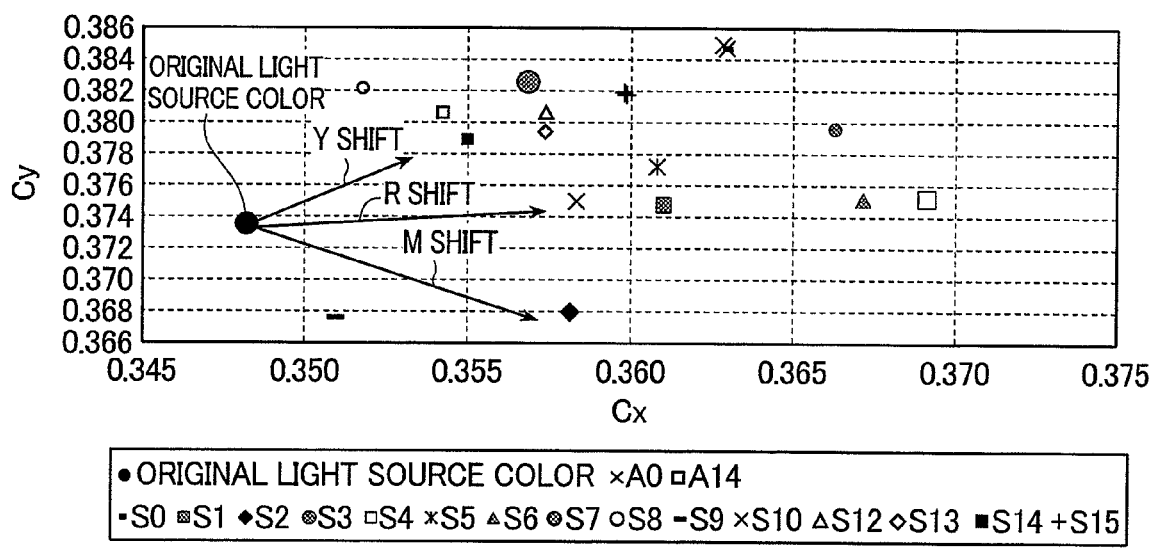
FIG. 9 is a graph illustrating measurements of light emitted by a light source and transmitted through a chromaticity adjusting film.
Figure 10:
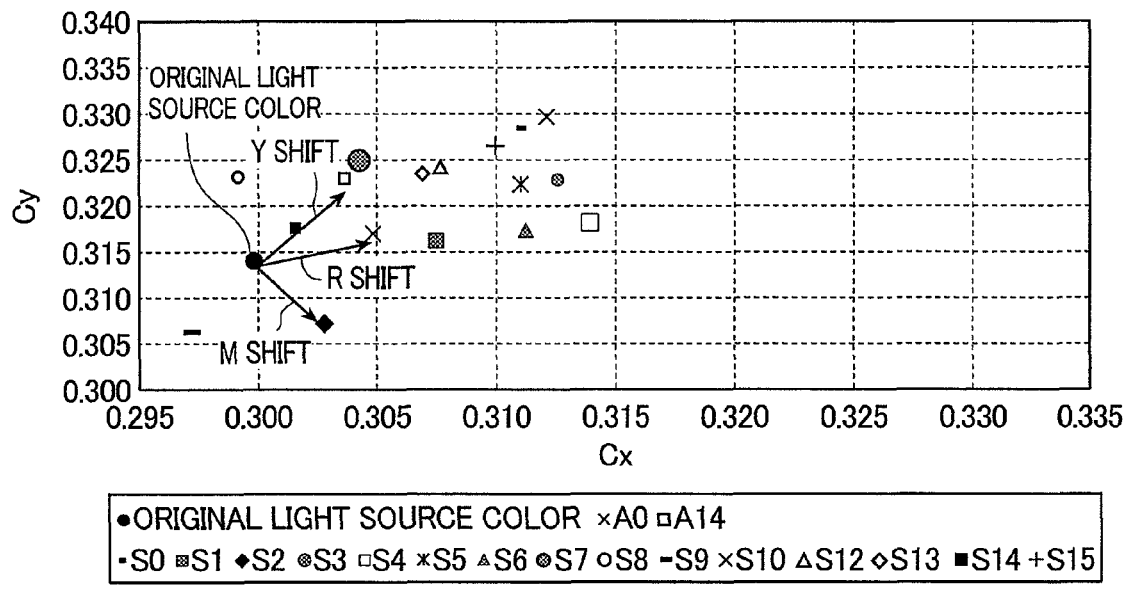
FIG. 10 is a graph illustrating measurements of light emitted by another light source and transmitted through the chromaticity adjusting film.
Figure 11:
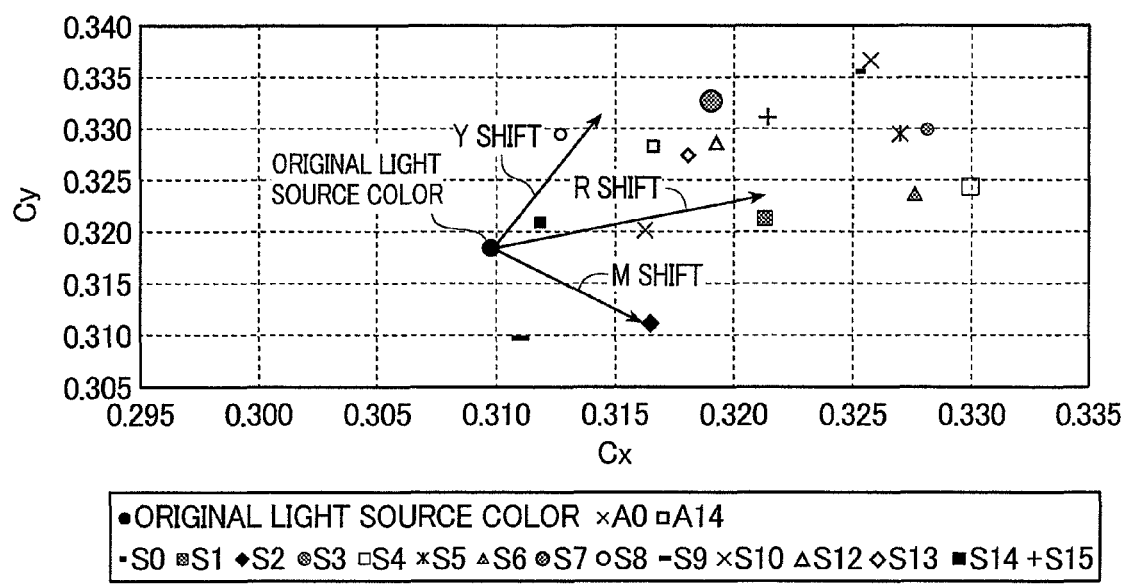
FIG. 11 is a graph illustrating measurements of light emitted by another light source and transmitted through the chromaticity adjusting film.

FIGS. 9 to 11 illustrate the measurements obtained.

FIG. 9 is a graph illustrating the measurements of light emitted by the cold cathode tube (CCFL) having a color temperature of 3500 K and transmitted through the chromaticity adjusting films given in Tables 1 and 2; FIG. 10 is a graph illustrating the measurements of light emitted by the LED element having a color temperature of 9150 K and transmitted through the chromaticity adjusting films given in Tables 1 and 2; and FIG. 11 is a graph illustrating the measurements of light emitted by the LED element having a color temperature of 8500 K and transmitted through the chromaticity adjusting films given in Tables 1 and 2.

As illustrated in FIGS. 9 to 11, the color temperature of emitted light can be adjusted as desired by providing various chromaticity adjusting films. Specifically, the color of emitted light can be shifted from the original light source color in various color directions such as R (red) direction, Y (yellow) direction, and M (magenta) direction, as illustrated by arrows in FIGS. 9 to 11.

Thus, color rendition and color temperature reproduction range can be improved. Where blue LEDs are used together with fluorescent substance to emit white light, color reproduction of red can be improved by providing chromaticity adjusting films.

The locations of the chromaticity adjusting films are not limited specifically; the chromaticity adjusting films may be located between the light exit plane of the light guide plate and the optical members, between optical members, or between the light source and the light guide plate.

Instead of providing the chromaticity adjusting films, one may apply ink containing white ink mixed with various inks each in given amounts as described earlier to the surface of, for example, the diffusion film, the prism sheet and/or the light guide plate.

To increase the light admission efficiency, the light source and the light guide plate are preferably disposed such that the direction of the optical axis of the light emitted by the light source to be incident on the light entrance plane lies in the same direction as the direction perpendicular to the light entrance plane. However, the present invention is not limited thereto; the light source and the light guide plate may be disposed such that the optical axis direction lies in a different direction from the direction perpendicular to the light entrance plane.

Figure 12A:
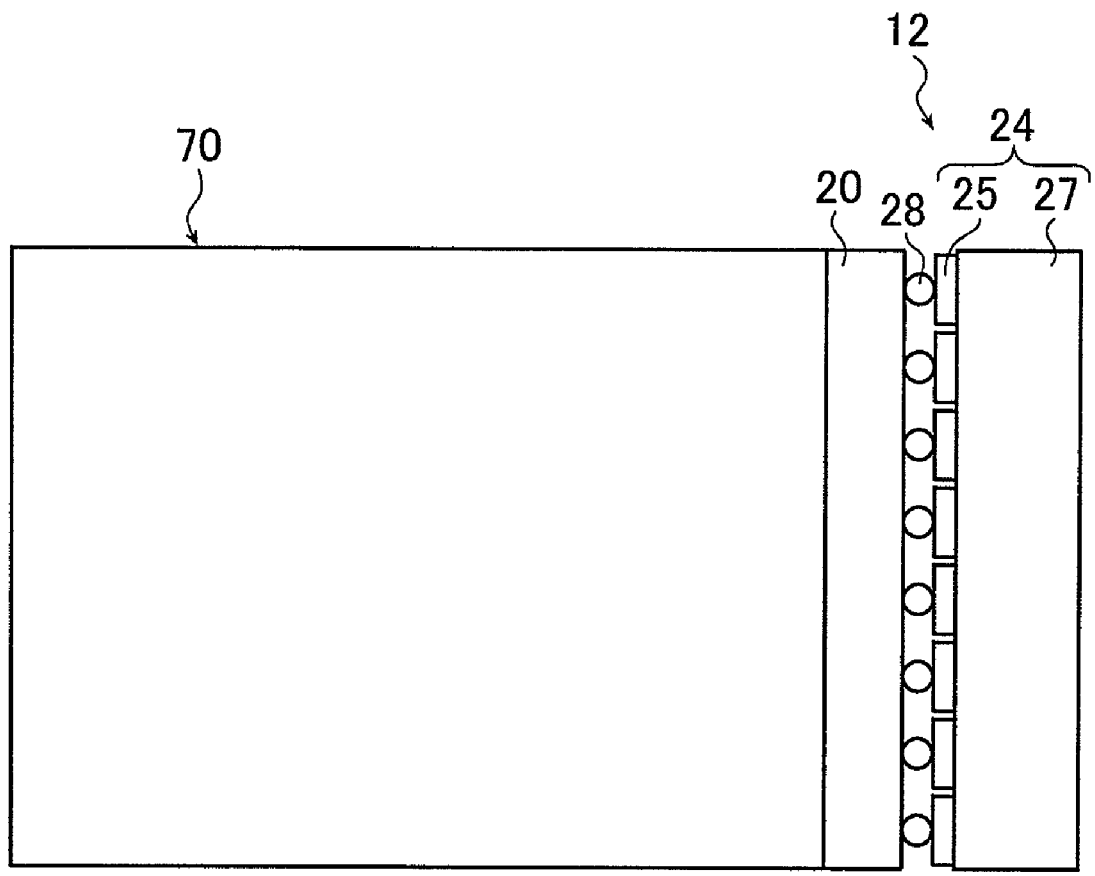
FIG. 12A is a schematic plan view of an example of another configuration of the light guide plate that may be used in the inventive backlight unit.
Figure 12B:
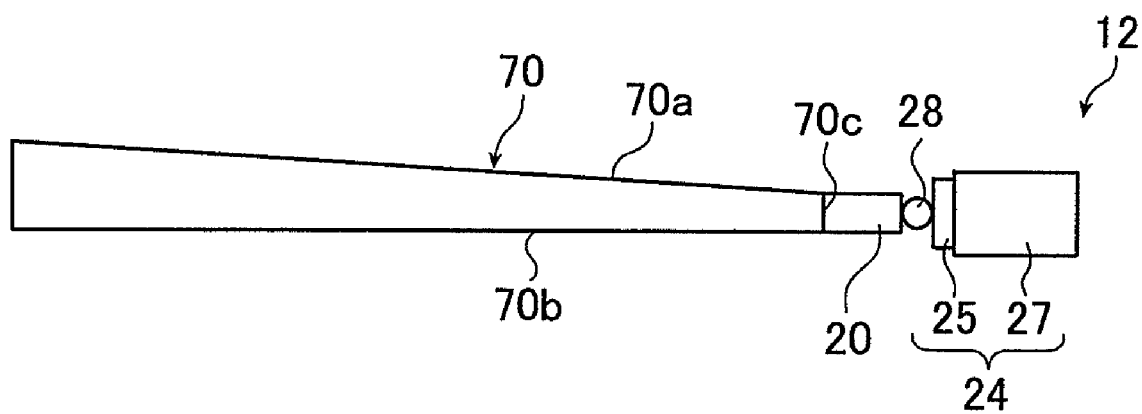
FIG. 12B is a schematic sectional view thereof.

FIGS. 12A and 12B illustrate another example of a configuration that may be used in the inventive backlight unit. FIG. 12A is a schematic plan view illustrating a light guide plate 70, the light mixer 20, and the light source 12; FIG. 12B is a schematic sectional view illustrating the light guide plate 70. In FIGS. 12A and 12B, the light source 12 and the light mixer 20 have the same functions as the light source and the light mixer of FIG. 1. Therefore, detailed description thereof will not be given here.

The light guide plate 70 has a structure comparable to the light guide plate 18 of FIG. 1 as overturned and has a light exit plane formed by a flat plane 70a, the plane on the opposite side being formed by a flat plane 70b. The inclined plane 70a of the light guide plate 70 is inclined with respect to the flat plane 70b such that the light guide plate grows thicker with the increasing distance from the light entrance plane. In the light guide plate 70 having such structure, light launched through a light entrance plane 70c exits through the inclined plane 70a.

The light guide plate 70 thus shaped also enables admitted light to reach a farther position as does the light guide plate 18 earlier described. Thus, a thinner and lighter planar lighting device is achieved.

The light guide plate 70 is also formed of a transparent resin containing scatterers as is the light guide plate 18 described earlier. Now, let $\Phi$ be the scattering cross section of scattering particles contained in the light guide plate, $L_G$ the length of the light guide plate in the direction in which light is launched, $N_p$ the density of the scattering particles contained in the light guide plate (number of particles in unit volume), and $K_C$ a compensation coefficient. Then a relationship preferably holds also in this case that the value $\Phi \cdot N_p \cdot L_G \cdot K_C$ is not less than 1.1 and not greater than 8.2, and $0.005 \leq K_C \leq 0.1$. Thus, uniform illumination light with a reduced level of brightness unevenness can be emitted through the inclined plane 70a.

In the backlight unit 2 using the light guide plate 18 having the shape illustrated in FIGS. 1A and 1B, the reflection sheet 22 has a shape inclined from the light entrance plane 18c of the light guide plate 18 toward the plane opposite to the light entrance plane 18c so as to conform to the inclined plane 18b located opposite to the light exit plane of the light guide plate 18. Where the light guide plate 70 having the shape as illustrated in FIG. 8 is used in the backlight unit, however, the reflection sheet (not shown) is formed parallel to the optical axis direction to cover the flat plane 70b of the light guide plate 70.

Note that with the light guide plate 70 of FIG. 12, prism arrays may be formed on the inclined plane 70a. Alternatively, prism arrays may be formed on the flat plane 70b, which is the plane opposite to the light exit plane of the light guide plate 70.

Figure 13A:
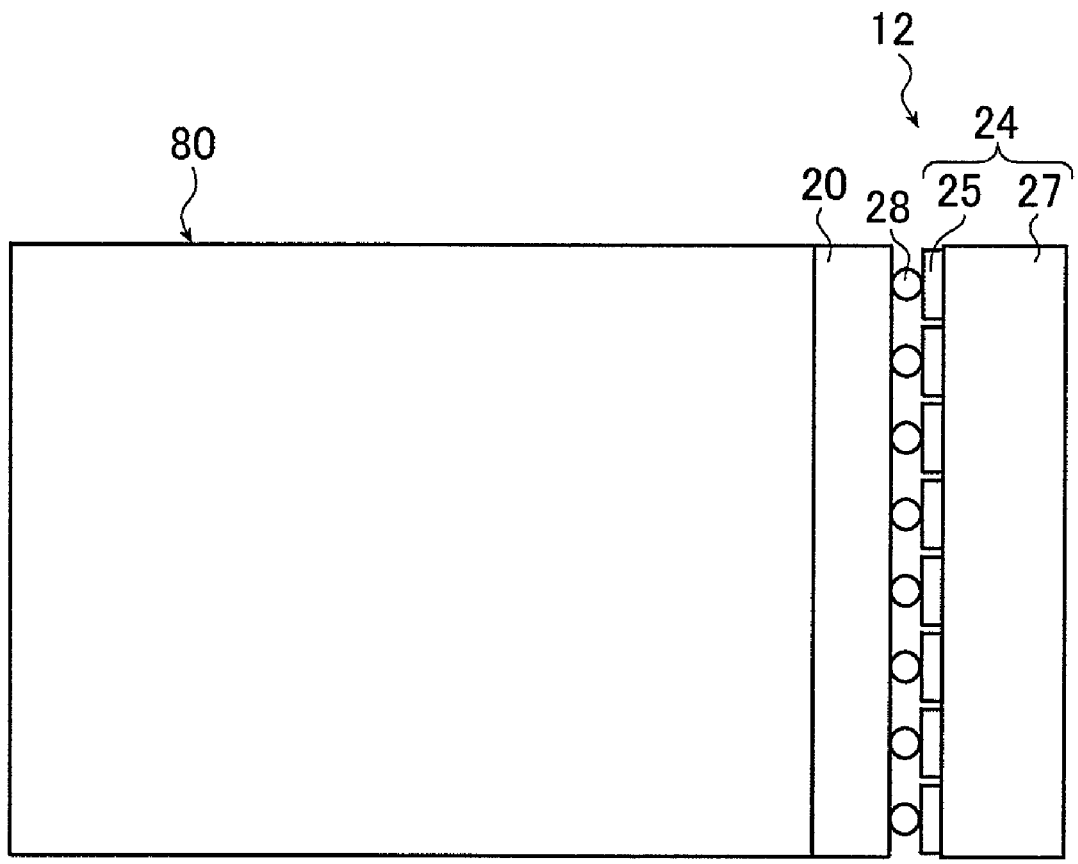
FIG. 13A is a schematic plan view of an example of yet another configuration of the light guide plate that may be used in the inventive backlight unit.
Figure 13B:
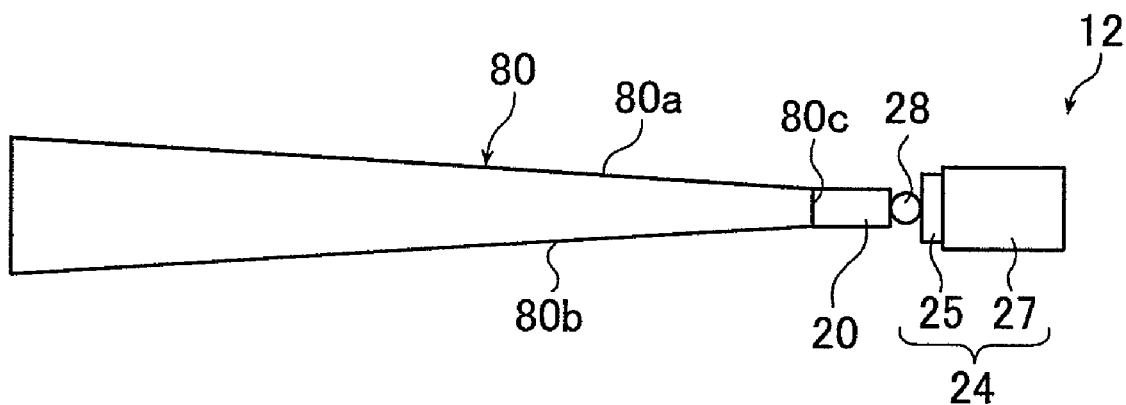
FIG. 13B is a schematic sectional view thereof.

FIGS. 13A and 13B illustrate yet another example of a configuration of the light guide plate that may be used in the inventive backlight unit. FIG. 13A is a schematic plan view illustrating a light guide plate 80, the light mixer 20, and the light source 12; FIG. 13B is a schematic sectional view illustrating the light guide plate 80. In FIGS. 13A and 13B, the light source 12 and the light mixer 20 have the same functions as the light source and the light mixer of FIG. 1. Detailed description thereof will therefore not be given here.

The light guide plate 80 illustrated in FIGS. 13A and 13B is shaped such that the light exit plane, through which light exits, and the opposite plane have an identical shape. The light exit plane of the light guide plate 80 consists of a first inclined plane 80a having a flat, rectangular external shape and inclined with respect to the optical axis direction. The opposite plane likewise consists of a second inclined plane 80b having a flat, rectangular external shape and inclined with respect to the optical axis direction. Expressed otherwise, the light guide plate 18 is configured such that the plane through which light is emitted and the opposite plane consist of inclined planes gently inclined so that the distance between these planes increases from the light entrance plane toward the plane opposite to the light entrance plane. Thus, the first inclined plane 80a and the second inclined plane 80b are inclined a given angle with respect to each other. The inclination angle by which the first inclined plane 80a is inclined with respect to the optical axis direction is the same as the inclination angle by which the second inclined plane 80b is inclined with respect to the optical axis direction. The light guide plate 80 is thinnest on the side thereof on which the light entrance plane is located, growing thicker with the increasing distance from the light entrance plane 80c, and thickest where the plane opposite to the light entrance plane 80c is located.

In the light guide plate 80 illustrated in FIGS. 13A and 13B, light admitted through the lateral plane travels inside the light guide plate 80 and is emitted through the first inclined plane 80a. In the process, part of the light may leak through the second inclined plane 80b but is reflected by the reflection sheet (not shown) so disposed as to cover the rear side of the light guide plate 80 back into the light guide plate.

The light guide plate 80 having the shape illustrated in FIGS. 13A and 13B also enables admitted light to reach a farther position as does the light guide plate 18 earlier described. Thus, a thinner and lighter planar lighting device is achieved.

While the embodiment under discussion preferably has a shape symmetrical with respect to an axis lying in the optical axis direction, the embodiment under discussion is not limited thereto and may have a shape asymmetrical with respect to the optical axis direction, such as a shape where the first inclined plane is inclined with respect to the optical axis direction by an inclination angle different from the inclination angle by which the second inclined plane is inclined with respect to the optical axis direction or a shape where the first inclined plane has a different shape than the second inclined plane.

While the above embodiment has been described with respect to a case where only one light guide plate is provided, the invention is not limited thereto; one planar lighting device may comprise a plurality of light guide plates.

Figure 14:
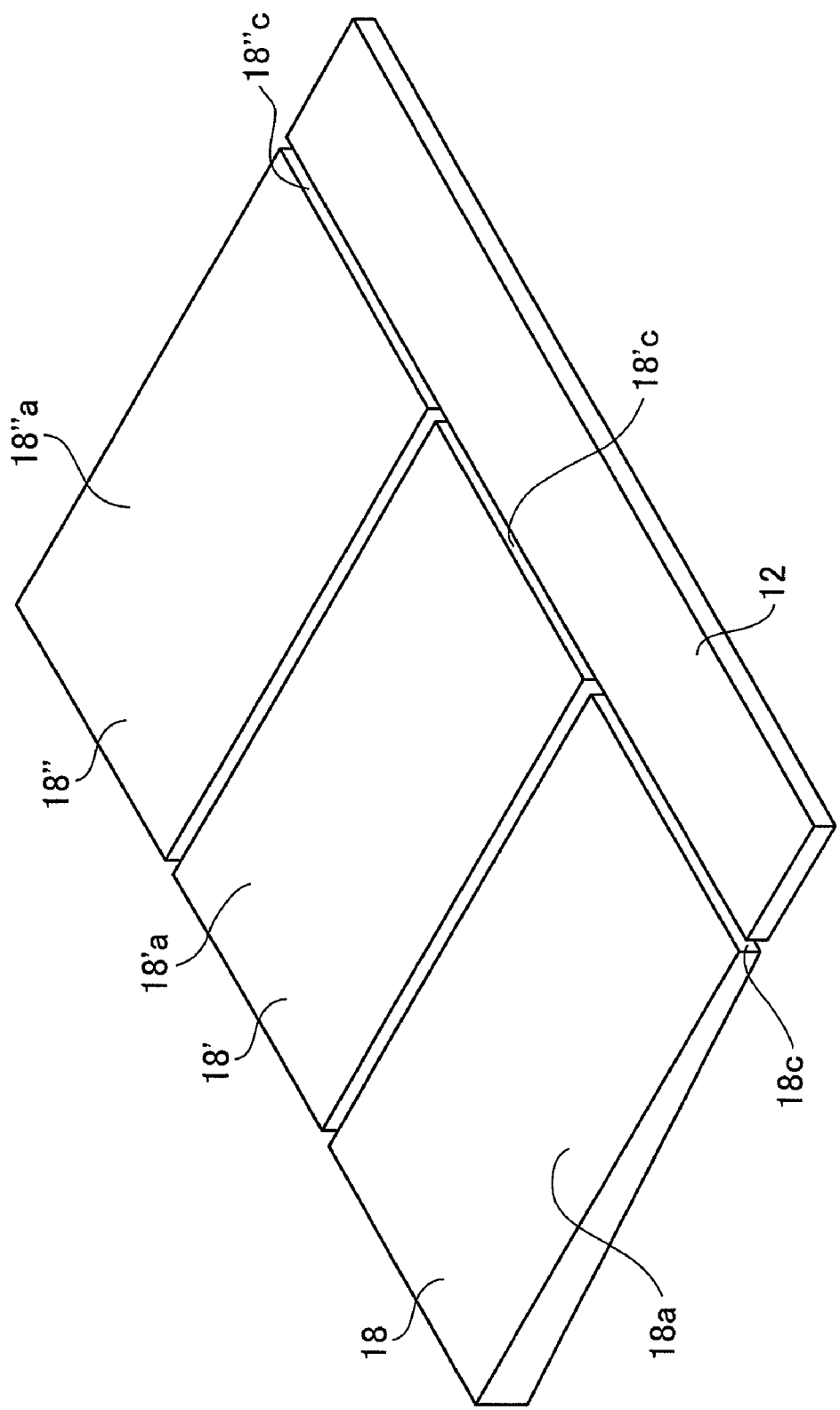
FIG. 14 is a schematic view illustrating a configuration of the planar lighting device using a plurality of light guide plates.

FIG. 14 illustrates an example of a planar lighting device using a plurality of light guide plates. FIG. 14 only shows a light guide plate 18, a light guide plate 18', a light guide plate 18'', and the light source 12 to clearly illustrate how the light guide plates are arranged.

The plurality of the light guide plates are arranged such that the light exit planes of the individual light guide plates lie in the same plane and that the light entrance planes thereof lie in the same plane. Specifically, the light guide plate 18 and the adjacent light guide plate 18' are so positioned that the light exit plane 18a of the light guide plate 18 and the light exit plane 18a' of the light guide plate 18' lie in the same plane and that the light entrance plane 18c of the light guide plate 18 and the light exit plane 18'c of the adjacent light guide plate 18' lie in the same plane. The light guide plate 18 and the adjacent light guide plate 18' are preferably in close contact with each other.

Likewise, the light guide plate 18' and the adjacent light guide plate 18'' are so positioned that the light exit plane 18'a and the light exit plane 18''a of the respective light guide plates lie in the same plane and that the light entrance plane 18'c and the light entrance plane 18''c lie in the same plane.

The light source 12 is located opposite to the light entrance planes 18c, 18c', and 18c'' of the light guide plates 18, 18', and 18''. Thus, light emitted from the common light source 12 enters the light entrance planes 18c, 18c', and 18c'' of the light guide plates 18, 18', and 18''.

The plurality of light guide plates juxtaposed as described above to form a single light exit plane provide a planar lighting device having a larger area and hence may be used as a planar lighting device for a larger liquid crystal display device.

The light exit plane formed by the plurality of light guide plates is preferably covered by a single diffusion film and a single prism sheet, though not shown in FIG. 14, as is the case with a single light source.

Now, the second embodiment of the inventive planar lighting device will be described.

While, in the first embodiment described above, one rectangular plane of the light guide plate is used as a light exit plane, two planes may be adapted to serve as light exit planes such that the light exit plane as so referred to above is a first light exit plane and the plane opposite to the first exit plane is a second light exit plane, thus emitting light through both planes.

Figure 15:
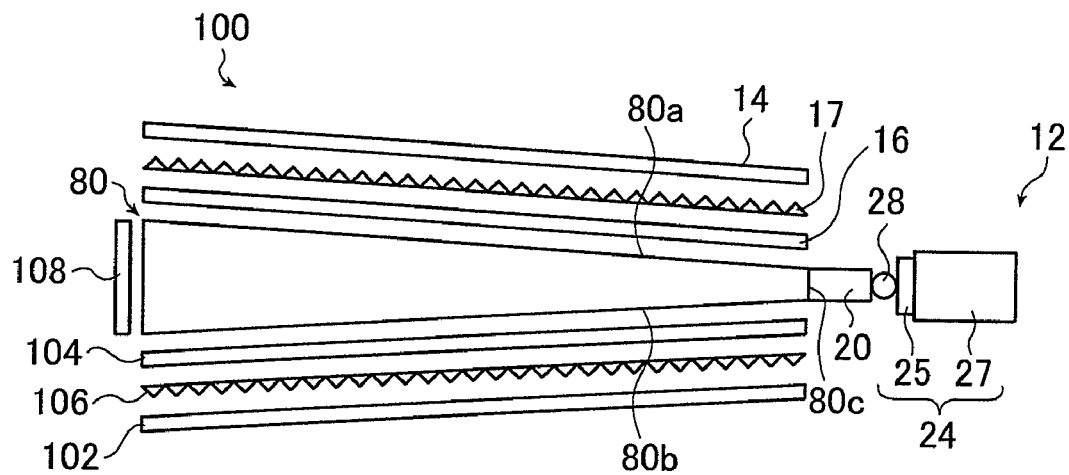
FIG. 15 is a schematic sectional view illustrating a configuration of an example of the planar lighting device according to a second embodiment of the invention.

FIG. 15 is a sectional view schematically illustrating a configuration of a planar lighting device (backlight unit) 100 according to the second embodiment. Note that the same components shared by the backlight unit 10 illustrated in FIGS. 1 and 2 are given like reference characters, omitting detailed description thereof. Thus, description below will focus upon unshared components.

The backlight unit 100 comprises the light source 12, the diffusion film 14 and 102, prism sheets 16, 17, 104, and 106, the light guide plate 80, the light mixer (mixing zone) 20, and a reflection sheet 108.

The light guide plate 80 has the same shape as the light guide plate illustrated in FIGS. 13A and 13B; the configuration is symmetrical with respect to the optical axis direction and comprises the first inclined plane 80a in the form of a rectangle inclined with respect to the optical axis direction, the second inclined plane 80b in the form of a rectangle located on the opposite side and inclined with respect to the optical axis direction, and the light entrance plane 80c opposite to the light source 12 and admitting light from the light source 12. The first inclined plane 80a and the second inclined plane 80b are inclined such that the light guide plate grows thicker from the light entrance plane 80c to the plane opposite to the light entrance plane 80c. In other words, the first inclined plane 80a and the second inclined plane 80b are so inclined as to be farther from each other with the increasing distance from the light entrance plane 80c.

The prism sheets 16 and 17 and the diffusion film 14 are disposed on the surface of the first inclined plane 80a of the light guide plate while the prism sheets 104 and 106 and the diffusion film 102 are disposed on the surface of the second inclined plane 80b.

The reflection sheet 108 is so disposed as to face the plane opposite to the light entrance plane 80c of the light guide plate 80.

Since the diffusion film 102, the prism sheets 104 and 106, and the reflection sheet 108 have the same configuration and shape as the diffusion film, the prism sheets, and the reflection sheet described earlier, detailed description thereof is not given here.

Thus, the backlight unit 100 according to the embodiment under discussion, which is not provided with a reflection sheet but provided with the prism sheets 104 and 106 and the diffusion film 102 on the side closer to the second inclined plane 80b, is capable of emitting light launched through the light entrance plane 80c through both planes, the first inclined plane 80a and the second inclined plane 80b. Thus, both planes, the first inclined plane 80a and the second inclined plane 80b, can be the light exit planes.

Accordingly, the present invention enables reduction of weight and thickness of the planar lighting device and increase in dimensions thereof as well as emission of uniform light through both planes, i.e., the planes located on the top and the bottom.

Thus, where, for example, a liquid crystal display panel is disposed opposite to both light exit planes of the planar lighting device, a single planar lighting device suffices to provide a liquid crystal display device capable of displaying different images on two planes. Further, ability to emit light on both sides thereof increases the variety of applications and broadens the range of application to include ornamental lighting and POP (point-of-purchase) advertising.

Further, while the symmetrical shape of the light guide plate with respect to the optical axis direction as in the embodiment under discussion enables emission of light with uniform brightness through two light exit planes, the invention is not limited thereto; the light guide plate may have a shape asymmetrical with respect to the optical axis direction, such as a shape where the first inclined plane is inclined with respect to the optical axis direction by an inclination angle different from the inclination angle by which the second inclined plane is inclined with respect to the optical axis direction or a shape where the first inclined plane has a different shape than the second inclined plane. Where a shape asymmetrical with respect to the optical axis direction is used, the amount of light emitted through the first incline plane and the second incline plane can be adjusted by adjusting the inclination angles or the shape of the planes. Specifically, the brightness can be adjusted to a desired level such that, for example, brightness of light through one light exit plane is increased while brightness of light through the other light exit plane is reduced by adjusting the inclination angle.

Further, one of the planes may be parallel to the incident direction of light. That is, the light guide plate used may also have various shapes illustrated in FIGS. 1 to 8, where light is emitted through two light exit planes.

Further, the backlight unit according to the second embodiment of the invention is not limited to the configuration described above and allows various improvements and modifications as does the first embodiment of the planar lighting device described earlier.

Figure 16:
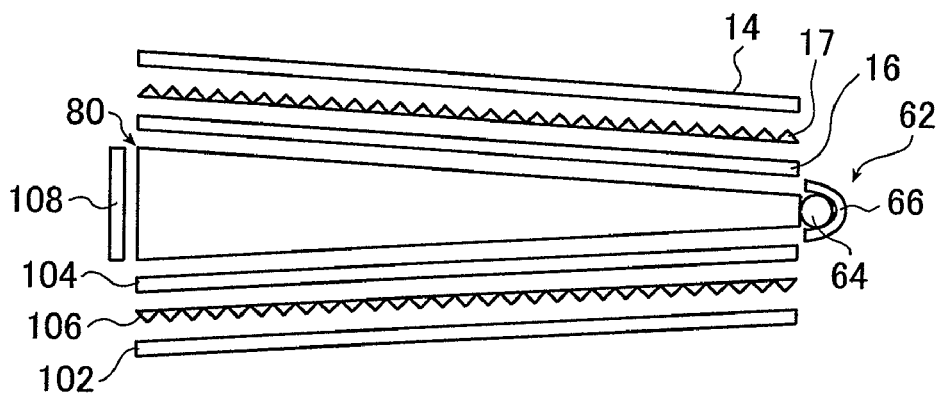
FIG. 16 is a schematic view of an example of the planar lighting device using a cold cathode tube as the light source.

For example, the light source may use the cold cathode tube 64 as illustrated in FIG. 16. Further, various types of light source may be used such as a semiconductor laser (LD), a fluorescent tube, a hot cathode tube, and an external electrode tube.

Further, the light guide plate may also have various shapes described above.

Now, the third embodiment of the inventive planar lighting device will be described.

Figure 17:
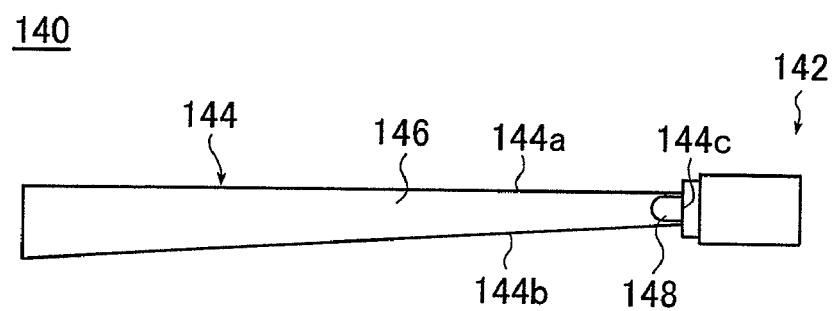
FIG. 17 is a schematic sectional view illustrating a configuration of an example of the planar lighting device according to a third embodiment of the invention.

FIG. 17 is a schematic sectional view illustrating a configuration of a planar lighting device (backlight unit) 140 according to the third embodiment. Note that in the backlight unit 140 of FIG. 17, the same components shared by the backlight unit 10 illustrated in FIGS. 1 and 2 are given like reference characters, omitting detailed description thereof. Thus, description below will focus upon unshared components.

The backlight unit 140 comprises a light source 142, the diffusion film 14, the prism sheets 16 and 17, a light guide plate 144, and a reflection film 22.

The light source 142 are substantially the same as the LED array 24 of FIG. 3.

The light guide plate 144 comprises a flat, substantially rectangular light exit plane 144a, an inclined plane 144b located on the side opposite from the light exit plane 144a and inclined a given angle with respect to the light exit plane 144a, and a light entrance plane 144c that is located opposite to the LED array and through which light is launched. Part of the light guide plate 144 closer to the side thereof on which the light entrance plane 144c is located is formed of material having a low refractive index member 148, which is a different from that forming the other part of the light guide plate 144 (referred to below as base material 146).

The low refractive index member 148 forms the light entrance plane 144c together with the base material 146 and is in contact with the base material 146 except for the plane thereof defining the light entrance plane 144c. That is, the low refractive index member 148 is covered with the base material 146 on the sides thereof facing the light exit plane 144a, the inclined plane 144b, and the plane opposite to the light entrance plane 144c. The low refractive index member 148 has a shape comparable to a half cylinder curving outward toward the plane opposite to the light entrance plane 144c.

Such a light guide plate may also be manufactured using an extrusion molding method or an injection molding method. Alternatively, the base material 146 and the low refractive index member 148 may be manufactured separately, thereon fitting or bonding the low refractive index member 148 to the base material 146.

Now, let Ni be the refractive index of the low refractive index member 148 and Nm the refractive index of the base material 146. Then low refractive index member 148 satisfies a relationship Nm>Ni.

Incorporating a low refractive index member having a lower refractive index than the base material in a part including the light entrance plane and admitting light emitted by the light source into the low refractive index member enables reduction of Fresnel loss of light emitted by the light source and admitted through the light entrance plane, which increases the light admission efficiency.

Further, the low refractive index member 148 has a function to collimate and mix admitted light, i.e., a function performed by the coupling lens and the mixer. The backlight unit according to the embodiment under discussion, provided with the low refractive index member, allows light emitted by the light source to reach a farther position without the coupling lens and the mixer and is capable of emitting uniform light free from brightness unevenness.

The light entrance plane of the light guide plate is preferably formed of a low refractive index member substantially in its entirety. Where substantially the entire surface of the light entrance plane of the light guide plate is formed of a low refractive index member, light emitted by the light source and entering the light guide plate can be admitted into the low refractive index member, which further improves the light admission efficiency.

While the low refractive index member 148 of FIG. 17 has the shape of a half cylinder curving outward toward the plane opposite to the light entrance plane, the present invention is not limited thereto.

FIGS. 18A to 18C are schematic sectional views illustrating other examples of the light guide plate and the light source that may be used in the inventive backlight unit. Note that the light guide plates illustrated in FIGS. 18A to 18C have an identical shape in cross section taken at any position.

FIG. 18A illustrates a light guide plate 151 comprising a low refractive index member 152 having a square cross section. FIG. 18B illustrates a light guide plate 153 comprising a low refractive index member 154 having a trapezoidal cross section, where a plane 154a, the light entrance plane, is parallel to a plane 154b opposite to the light entrance plane, the plane 154b opposite to the light entrance plane being shorter than the plane 154a, the light entrance plane. FIG. 18C illustrates a light guide plate 155 comprising a low refractive index member 156 having a triangular cross section, where the base is the plane serving as the light entrance plane and the vertex is located on the side opposite from the light entrance plane.

The low refractive index member having the shape as described above can also improve the light admission efficiency.

Further, the shape of the low refractive index member is not limited to the shapes represented by the above examples; the cross section may have various shapes such as, for example, a semicircle, a hyperbola, and a parabola.

While components of the backlight unit according to the third embodiment of the invention have been described in detail above, the present invention is not limited thereto.

FIG. 19 is a schematic sectional view illustrating another example of the backlight unit according to the third embodiment of the invention. The components of a backlight unit 160 are basically the same as those of the backlight unit 140 of FIG. 17 except that the backlight unit 160 has reflection members 162 close to the light entrance plane 144c of the light guide plate 144. Accordingly, like components share like reference characters between the two, and detailed descriptions thereof will not be given here, focusing instead upon features unique to the backlight unit 160 below.

The reflection members 162 are provided to reflect light leaking through a part of the light entrance plane 144a and the inclined plane 144b that is close to the light entrance plane of the light guide plate 144 back into the light guide plate. The reflection members 162 are provided, for example, by application, evaporation, or by bonding to part of the light exit plane 144a of the light guide plate 144 closer to the light entrance plane 144c and to part of the inclined plane 144b closer to the light entrance plane 144c.

The reflection members 162 may be formed of any material capable of reflecting light leaking through the part of the light exit plane 144a and the inclined plane 144b of the light guide plate 144 close to the light entrance plane. The reflection members 162 may be formed, for example, of a resin sheet produced by kneading, for example, PET or PP (polypropylene) with a filler and then drawing the resultant mixture to form voids therein for increased reflectance; a sheet with a specular surface formed by, for example, depositing aluminum vapor on the surface of a transparent or white resin sheet; a metal foil such as an aluminum foil or a resin sheet carrying a metal foil; or a thin sheet metal having a sufficient reflective property on the surface.

The reflection members 162 provided close to the light entrance plane 144c on the light exit plane 144a and the inclined plane 144b prevent leakage of light near the light entrance plane 144c where light is liable to exit because of a short distance from the light source 142, and enable light, which conventionally was allowed to exit near the light entrance plane, to reach a farther position. This permits an efficient use of light admitted into the light guide plate.

While the low refractive index member is preferably provided close to the light entrance plane of the light guide plate as in the embodiment under discussion to achieve an increased light admission efficiency, the present invention is not limited thereto; light use efficiency can also be increased by only providing reflection members without providing the low refractive index member.

In the embodiment under discussion, the reflection members are provided on both the light exit plane and the inclined plane. Where the reflection sheet is provided on the inclined plane, however, the reflection sheet serves as reflection member and, hence, the reflection member need only be provided on part of the light exit plane closer to the light entrance plane.

While the planar lighting device according to the present invention has been described in detail above, the present invention is not limited to the above embodiments; various improvements and modifications may be made without departing from the spirit of the present invention.

For example, the second embodiment and the third embodiment described above may be combined to comprise the low refractive index member in the light guide plate closer to the light entrance plane and/or reflection members near the light entrance plane of the light guide plate, with two planes of the light guide plate adapted to serve as light exit planes to emit light through the two planes perpendicular to the light entrance plane and opposite each other.

Further, the planar lighting device may be adapted to comprise on the side thereof closer to the light exit plane a transmittance adjusting member having the function of reducing brightness unevenness of the light emitted through the light exit plane.

FIG. 20 is a schematic sectional view of a planar lighting device 180 provided with a transmittance adjusting member 182. The planar lighting device 180 of FIG. 20 has the same configuration as the planar lighting device 10 of FIGS. 1 and 2 except for the transmittance adjusting member 182 and the order in which the members disposed on the light exit plane of the light guide plate are arranged. Accordingly, the same components shared by both planar lighting devices are indicated by like reference characters and detailed description thereof will not be given here.

The planar lighting device 180 comprises the transmittance adjusting member 182, the diffusion film 14, and the prism sheet 17 disposed on each other in this order on the light exit plane 18a.

As described above, the transmittance adjusting member 182 is used to reduce brightness unevenness of light emitted from the light guide plate and comprises a transparent film 184 and numerous transmittance adjusters 186 arranged on the surface of the transparent film 184.

The transparent film 184 is in the form of a film and formed of optically transparent resins such as PET (polyethylene terephthalate), PP (polypropylene), PC (polycarbonate), PMMA (polymethyl methacrylate), benzyl methacrylate, MS resins, other acrylic resins or COP (cycloolefin polymer).

The transmittance adjusters 186 are dots of various sizes having a given transmittance and have various shapes such as a rectangle, a circle, and a hexagon; the transmittance adjusters 186 are formed, by printing for example, on the whole surface of the transparent film 184 facing the light guide plate 18 in a given pattern, or in such a pattern, for example, that the sizes of dots or the number of dots vary according to the location (halftone dot pattern).

The transmittance adjusters 186 need only be diffusion reflectors and may, for example, be formed by applying a material that diffuses light as exemplified by silica; pigments such as titanium oxide and zinc oxide; a resin; and beads of glass, zirconia, etc., together with a binder, or may be a pattern created by machining a surface to form an asperity thereon or by grinding a surface to roughen the surface. Otherwise, one may use a material having a high reflectance and a low light-absorbing property such as metals as exemplified by Ag and Al.

One may also use ordinary white ink as used in screen printing, offset printing, etc. to form the transmittance adjusters 186. Examples of ink that may be used include ink obtained by dispersing titanium oxide, zinc oxide, zinc sulfate, barium sulfate, etc. into acrylic binder, polyester binder, vinyl chloride binder, etc.; and ink given a diffusing property by mixing titanium oxide with silica.

The transmittance adjusting member 182 has numerous transmittance adjusters 186 are distributed on the surface of the transparent film 184 facing the light guide plate unit 18 in a given pattern such that the pattern density of the transmittance adjusters 186 varies according to the location on the surface.

Now, let $\rho(x, y)$ be the pattern density of the transmittance adjusting member 182 at a given position (x, y) and F (x, y) the relative brightness of light emitted at a given position (x, y) on the light exit plane of the backlight unit 180 (plane facing the liquid crystal display panel 4) having no transmittance adjusting member 182. Then the relationship between the pattern density $\rho(x, y)$ of the transmittance adjusting member 182 and the relative brightness F(x, y) preferably satisfies the following expression (5).

$$\rho(x, y) = c\{F(x, y) - F_{min}\}/(F_{max} - F_{min}) \qquad (5)$$

In the expression (5), $F_{max}$ denotes a maximum brightness, and $F_{min}$ denotes a minimum brightness, of light emitted through the light exit plane of the diffusion film 14 of the backlight unit 180 without the transmittance adjusting member 182. Note that the relative brightness F(x, y) is determined with reference to the maximum brightness $F_{max}$ ($F_{max}$=1).

The value of "c," a maximum density, preferably satisfies $0.5 \leq c \leq 1$.

The pattern density ρ(x, y) denotes occupancy per unit area (1 mm²) of the transmittance adjusters 186 existent at a given position (x, y). When ρ(x, y)=1, the transmittance adjusters 186 are provided on the whole surface within the unit area; when ρ(x, y)=0, no transmittance adjuster 186 is provided within the unit area.

Where the density of the distribution of the transmittance adjusters is designed according to the above expression, there may be cases where brightness unevenness is observed depending on the angle of observation when the observation is made at an angle other than from the front. To remedy that, the calculated density distribution is preferably added with a "uniform pattern distribution (bias density ρb)." This reduces brightness unevenness and eliminates or reduces angular dependence of brightness unevenness.

The bias density ρb is preferably 0.01 to 1.50 (1 to 150%). When the distribution density is greater than 1 (100%), the transmittance adjusters are provided in two layers. Specifically, transmittance adjusters having a distribution density of (ρb−1) are further disposed on the transmittance adjusters laid on the entire surface.

The transmittance adjusters 186 of the transmittance adjusting member 182 so arranged as to satisfy the pattern density ρ(x, y) defined by the above expression (5) limit the lowering of the average brightness of light emitted through the light exit plane of the backlight unit 180 and reduces the brightness unevenness. Where brightness unevenness is thus reduced using the transmittance adjusting member 182, the diffusion sheet 14 need not achieve thorough diffusion of light. As a result, the diffusion sheet 14 may be made thinner, and the prism sheet need no longer be used, or the number of prism sheets used may be reduced, thus providing a backlight unit with a reduced weight at a lower cost.

As described earlier, the maximum density c is preferably in the range of $0.5 \leq c \leq 1$. The maximum density c not smaller than 0.5 limits the decrease of the average brightness and enables emission of light with enhanced brightness and uniformity.

The transmittance adjusters 186 preferably have a transmittance of 10% inclusive to 50% inclusive and, more preferably, 20% inclusive to 40% inclusive, when the pattern density ρ(x, y)=1 or, expressed otherwise, when the transmittance adjusters 186 are provided on the whole surface.

Where the transmittance is not smaller than 10%, brightness unevenness can be reduced in a suitable manner and where the transmittance is not greater than 50%, brightness unevenness can be reduced without lowering the average brightness.

Further, a transmittance of 20% inclusive to 40% inclusive allows the above effects to be achieved in a more suitable manner.

The transmittance adjusters may each have any shape including a rectangle, a triangle, a hexagon, a circle, and an ellipse.

Where the backlight unit uses a linear light source and a light guide plate shaped by uniaxial drawing as in the example under discussion, the transmittance adjusters may each be shaped into an elongate strip parallel to the axis of the linear light source.

While the above embodiment uses a transparent film as an optical member on which the transmittance adjusters are provided, the present invention is not limited thereto; the transmittance adjusters may be provided on a diffusion film or a prism sheet. For example, the transmittance adjusters may be formed on the diffusion film 14 or the prism sheets 16 and 17 illustrated in FIG. 20 instead of the transparent film. This enables reduction of the number of components required and, hence, reduction of manufacturing costs.

The pattern density distribution of the transmittance adjusters 186 of the transmittance adjusting member 182 are adjusted according to the incident light on the transmittance adjusting member 182. The pattern density distribution of the transmittance adjusters 186 may be adjusted by varying the size of the transmittance adjusters 186 or by varying the pitches or the intervals at which the transmittance adjusters 186, each having a given shape, are arranged.

The transmittance adjusters 186 may be arranged according to the pattern density by any of various methods including the FM screening method and the AM core method; among these methods, the FM screening method is preferably used. By the FM screening method, the transmittance adjusters 186 can be arranged as fine, even-sized dots dispersedly and densely depending upon the location, making it difficult to visually recognize the arrangement pattern of the transmittance adjusters 186 on the light exit plane of the backlight unit. Specifically, the FM screening method prevents projection of the arrangement pattern of the transmittance adjusters 186 on the light exit plane of the backlight unit and emission of uneven light, thus enabling emission of light with increased uniformity. That method also precludes the possibility that the dot size of the transmittance adjusters 186 is too small to achieve formation thereof.

Preferably, the transmittance adjusters 186 each have a maximum size of 500 μm or less, say, a side of 500 μm or less when they are rectangular, a major axis of 500 μm or less when they are elliptical, and more preferably, 200 μm or less. The transmittance adjusters 186 each measuring 500 μm at a maximum make visual recognition of the shapes of the transmittance adjusters 186 difficult; the transmittance adjusters 186 each measuring 200 μm at a maximum make visual recognition of the shapes of the transmittance adjusters 186 no longer possible with the result that the shapes of the transmittance adjusters 186, when actually used for a liquid crystal display device, are not projected on the light exit plane of the backlight unit to exhibit brightness unevenness. Thus, brightness unevenness can be efficiently reduced.

Still more preferably, the transmittance adjusters 186 each measure 100 μm at a maximum. A maximum size of 100 μm reduces the visibility of the size to under a level recognizable by the naked eye with an increased certainty with the result that the shapes of the transmittance adjusters 186, when actually used for a liquid crystal display device, are not projected on the light exit plane of the backlight unit to exhibit brightness unevenness, thus reducing brightness unevenness with an increased certainty and efficiently.

The transmittance adjusters may be printed on the transparent film by various methods including screen printing, offset printing, gravure printing, and ink jet printing. Offset printing has an advantage of excellent productivity; screen printing has an advantage that ink application thickness can be increased and, hence, a transmittance of the patterned area can be reduced without having to increase the ink concentration. Ink jet printing permits printing on a three-dimensional object and, hence, is best suited to form the transmittance adjusters on the surface of the light guide plate.

When printing the transmittance adjusters on the surface of the transparent film, alignment marks may be printed on the transparent film outside the area in which the half dot pattern is arranged. The alignment marks formed on the transparent film facilitates alignment of the light guide plate with the transmittance adjusting member at the time of manufacture.

While the transmittance adjusting member is provided between the light guide plate and the diffusion film in the embodiment under discussion, the location is not limited thereto; they may be provided between the diffusion film and the prism sheet.

Further, the transmittance adjusting member is provided by arranging the transmittance adjusters on the transparent film, the present invention is not limited thereto; the transmittance adjusting member may be provided by arranging the transmittance adjusters on the surface of the diffusion film, the prism sheet, or the light guide plate. Specifically, the transmittance adjusters may be provided on at least one of the surface of the diffusion film closer to the light guide plate (plane through which light is admitted) and the surface of the diffusion film opposite from the light guide plate (plane through which light is emitted). The transmittance adjusters may alternatively be provided on at least one of the surface of the prism sheet closer to the light guide plate (plane through which light is admitted) and the surface of the prism sheet opposite from the light guide plate (plane through which light is emitted). Alternatively, the transmittance adjusters may be provided immediately on the light exit plane of the light guide plate.

Thus, the transmittance adjusting member can be formed by providing the transmittance adjusters on the surface of the diffusion film, the prism sheet, or the light guide plate without using the transparent film, further simplifying the layer configuration.

In addition to the above advantageous effects, the transmittance adjusters provided immediately on the light exit plane of the light guide plate enable the transmittance adjusters to be placed in an accurate position with respect to the brightness unevenness of light emitted from the light guide plate without the need to establish an alignment when assembling the planar lighting device.

The transmittance adjusters are preferably provided in a plurality of locations, i.e., on a plurality of optical members such as, for example, on the surface of the light guide plate and on the rear side of the diffusion film, thereby to form a plurality of transmittance adjusting members. Where the transmittance adjusters are thus provided on a plurality of optical members, the tolerance to misalignment between the arrangement pattern of the transmittance adjusters and the incident light at the individual locations where the transmittance adjusters are provided can be increased, thereby enabling emission of uniform light free from brightness unevenness and uneven coloration. Where the transmittance adjusters are provided in a plurality of locations, the transmittance adjusters may be arranged in one and the same arrangement pattern or in different arrangement patterns.

While, in the above embodiment, the transmittance adjusters of the transmittance adjusting member are arranged at a pattern density $\rho(x, y)$ satisfying the above expression (5) as a preferred embodiment, the present invention is not limited thereto; the transmittance adjusters may be arranged at various pattern densities for curbing the generation of brightness unevenness. For example, the transmittance adjusting member may be a known transmittance adjusting member, wherein the transmittance adjusters are arranged in such a manner as to have a density distribution in a direction perpendicular to the axis of the linear light source.

While all the examples given in the above embodiment have a flat light exit plane, the present invention is not limited thereto.

Figure 21A:
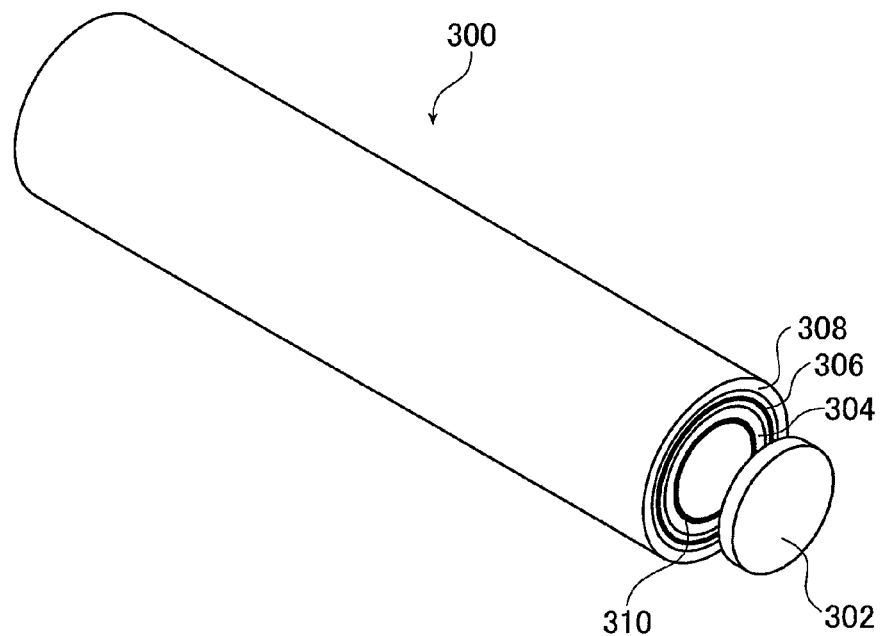
FIG. 21A is a schematic perspective view illustrating another example of the planar lighting device.
Figure 21B:
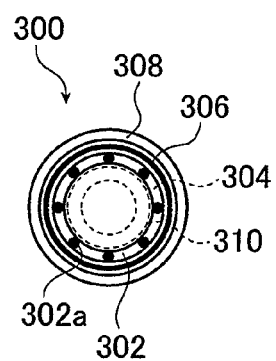
FIG. 21B is a schematic side view of the planar lighting device of FIG. 21A.
Figure 21C:
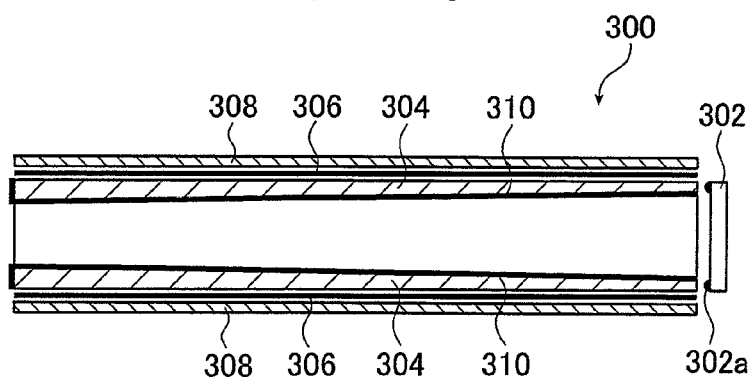
FIG. 21C is a schematic sectional view illustrating a longitudinal cross section of the planar lighting device of FIG. 21A.

FIGS. 21A to 21C illustrate another example of the planar lighting device. FIG. 21A is a schematic perspective view of a planar lighting device 300; FIG. 21B is a side view of the planar lighting device 300; and FIG. 21C is a schematic sectional view illustrating a longitudinal cross section of the planar lighting device 300.

The planar lighting device 300 comprises a light source 302, a light guide plate 304, a diffusion film 306, an acrylic pipe 308, and a reflection film 310.

The light source 302 is circular as illustrated in FIG. 21B and disposed opposite to one plane of the light guide plate 304. The light source 302 comprises a plurality of LEDs 302a. The plurality of LEDs 302a are disposed in an annular form conforming to the shape of the light entrance plane of the light guide plate 304. The LEDs 302a may be formed with various types of LEDs described earlier.

As illustrated in FIG. 21B, the light guide plate 304 has the shape of a hollow cylinder where the light exit plane is circular in cross section perpendicular to the direction in which light emitted by the light source 302 is admitted while the periphery defines the light exit plane. As illustrated in FIG. 21C, the light guide plate 304 increases in thickness from the light entrance plane defining the upper or lower end face of the cylinder toward the other end face in such a manner as to be thinnest at the light entrance plane and thickest at the end face opposite to the light entrance plane. Thus, the light guide plate 304 has substantially the same shape in cross section parallel to the direction in which light emitted by the light source 302 is admitted as, for example, the light guide plate 18 described above.

The diffusion film 306 is provided on the light exit plane of the light guide plate 304. Specifically, the diffusion film 306 is provided in the form of a cylinder to cover the peripheral surface of the cylindrical light guide plate 304.

The acrylic pipe 308 is given the shape of a hollow cylinder and provided over the periphery of the diffusion film 306. The acrylic pipe 308 is formed of a transparent resin.

The reflection film 310 is provided on the side of the light guide plate 304 closer to the inclined plane, i.e., on the inside of the cylindrical light guide plate 304 and on the side opposite to the light entrance plane.

Thus, the planar lighting device 300 has the cylindrical reflection film 310, the light guide plate 304, the diffusion film 306, and the acrylic pipe 308 overlaid on one another in this order from the inside outwardly.

The planar lighting device 300 has similar components to those of the planar lighting devices described earlier except that the it has a cylindrical exterior and hence the shapes, materials, etc, of the components will not be described in detail here.

Also in the planar lighting device 300, the light leaving the light source 302 and entering the light guide plate 304 is diffused by the scattering particles inside, exits through the light exit plane either directly or after being reflected by the reflection film 310, and is transmitted through the diffusion film 306 and the acrylic pipe 308 before emission.

In the planar lighting device 300, the peripheral surface of the cylinder defines the light exit plane; light is emitted through the whole surface of the peripheral surface. Thus, light can be emitted in all the directions covering 360°. The planar lighting device can therefore be used like a fluorescent lamp.

Thus, the inventive planar lighting device may have the shape of a rod comparable to a rod-type fluorescent lamp that is used as a lighting device and may be used for substantially the same applications as a fluorescent lamp.

While, in the embodiment under discussion, only the diffusion film is provided on the light exit plane of the light guide plate, various optical members may also be provided as in the embodiments of the planar lighting device described earlier to achieve like effects.

The shape of the planar lighting device is not limited to a cylinder.

Figure 22A:
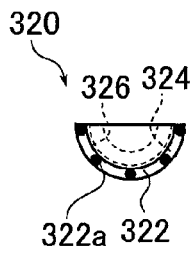
FIG. 22A is a schematic side view of still another example of the planar lighting device.
Figure 22B:
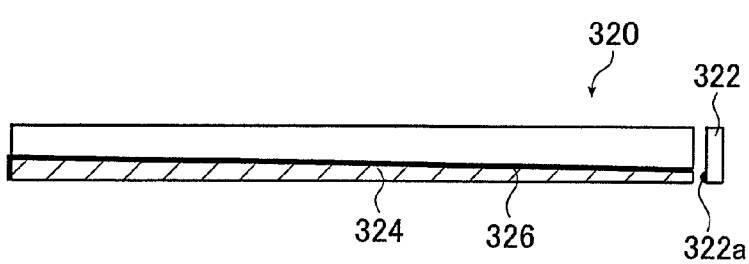
FIG. 22B is a schematic sectional view illustrating a longitudinal cross section of the planar lighting device of FIG. 22A.

FIGS. 22A and 22B illustrate still another example of the planar lighting device. Specifically, FIG. 22A is a schematic side view of a planar lighting device 320; FIG. 22B is a schematic sectional view illustrating a longitudinal cross section of the planar lighting device 320.

As illustrated in FIGS. 22A and 22B, the planar lighting device 320 comprises a light source 322, a light guide plate 324, and a reflection film 326. Further, the diffusion film and the acrylic pipe, though not shown, are provided on the peripheral surface of the light guide plate 324, as in the planar lighting device 300.

The planar lighting device 320, as seen in cross section perpendicular to the direction in which light emitted by the light source 322 is admitted, has the shape of a half cylinder obtained by halving the sectionally circular planar lighting device 300. Specifically, the light source 322, the light guide plate 324, and the reflection film 326 have the shape of a half cylinder.

The planar lighting device in the form of a half cylinder may also be used in a suitable manner. In applications where, for example, the planar lighting device is provided on the ceiling for indoor illumination like a fluorescent lamp, the planar lighting device, when given the shape of a half cylinder, is capable of illuminating the inside of a room without radiating light in the direction of the ceiling. This enables efficient indoor illumination to be achieved.

While the cylindrical light guide plate of the planar lighting device 300 illustrated in FIG. 21 is in the form of a straight tubular rod, the cylindrical light guide plate may be formed into a bent tubing to provide an annular planar lighting device.

Figure 23:
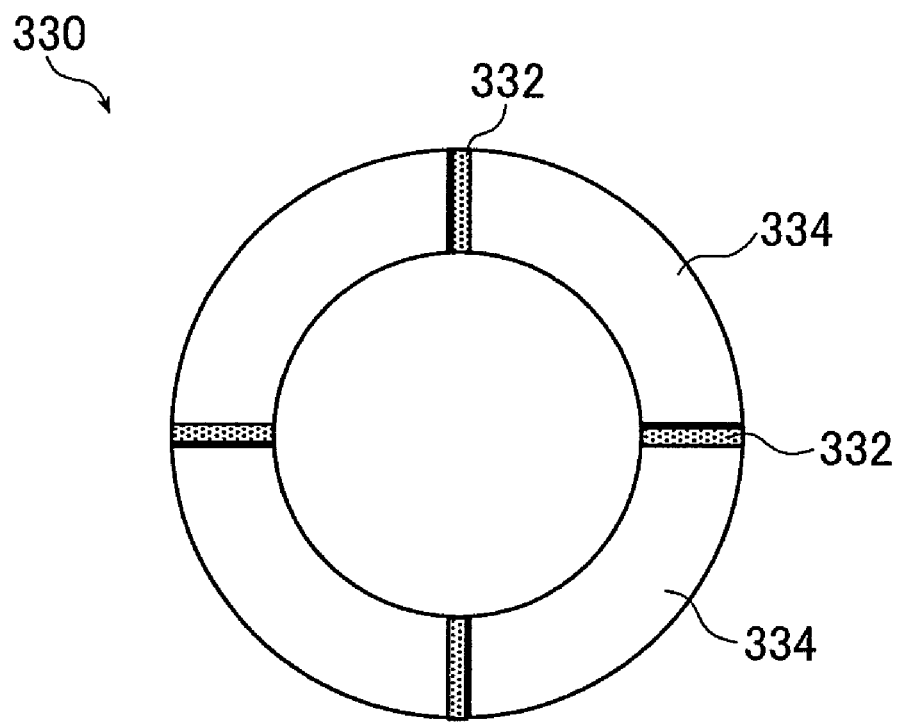
FIG. 23 is a schematic front view illustrating an example of an annular planar lighting device.
Figure 24:
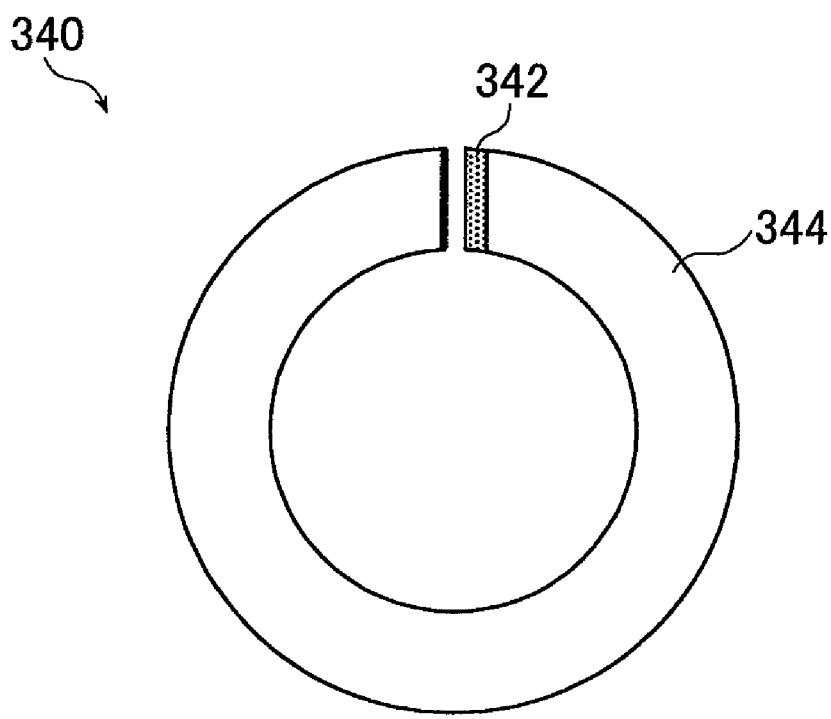
FIG. 24 is a schematic front view illustrating another example of the annular planar lighting device.

FIGS. 23, 24, and 25 are schematic front views illustrating examples of annular planar lighting devices.

A planar lighting device 330 illustrated in FIG. 23 comprises four light sources 332 and four light guide plates 334.

The light guide plates 334 each have the shape of a cylinder of which the peripheral surface provides the light exit plane such that the thickness thereof increases from an end face serving as light entrance plane toward the other end face. The light guide plates 334 each are bent tubings such that the axis passing through the individual cylinders forms a 90°-arc from end face to end face.

The light guide plates 334 are arranged such that the end faces of one light guide plate 334 are opposite to the end faces of the adjacent light guide plates 334 and that the four connected light guide plates 334 form a single ring.

One of the end faces of each light guide plate 334 is provided with the light source 332.

Thus, an annular planar lighting device can be made by forming the light guide plates 334 each into bent tubings and connecting a plurality of them in an arrangement as described above.

While the planar lighting device 330 has four light guide plates formed into an annular planar lighting device, the invention is not limited thereto. As illustrated in FIG. 24, for example, a single light guide plate may be formed into a shape such that the axis of the cylinder forms a circle to provide a planar lighting device 340 comprising a single light guide plate 344 and a light source 342 disposed on the end faces thereof, hence an annular planar lighting device.

Any number of light guide plates may be used to form an annular shape by setting the angle of the arc formed by the axis passing through the cylinders represented by the light guide plates.

Figure 25A:
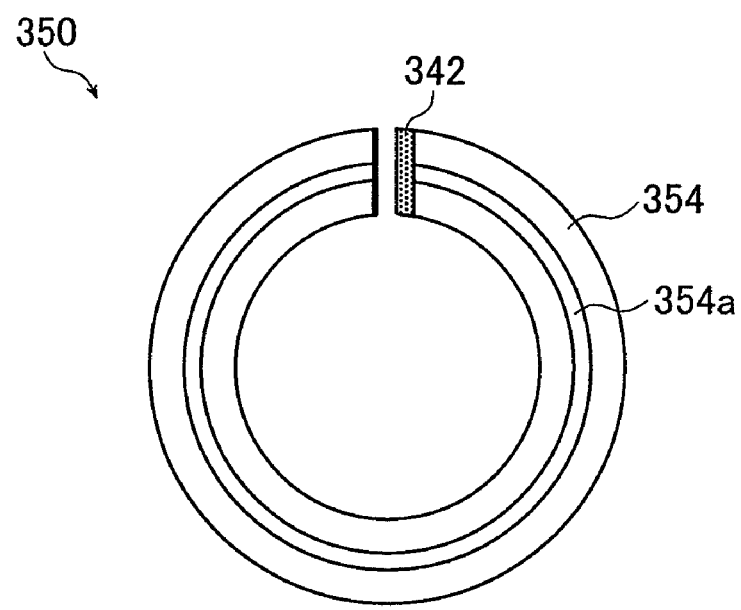
FIG. 25A is a schematic front view illustrating another example of the annular planar lighting device.
Figure 25B:
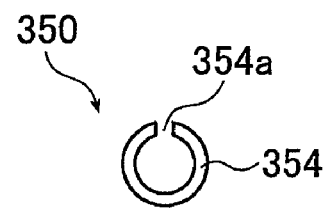
FIG. 25B is a sectional view of the planar lighting device of FIG. 25A.

Further, the planar lighting device is not limited to the shape of a rod or a ring and may have various shapes desired.

Where the light guide plate is formed into a cylinder, a groove 354a as illustrated in FIG. 25A is preferably formed in part of a cylindrical light guide plate 354 of a planar lighting device 350. Specifically, the groove 354a is preferably formed as illustrated in FIG. 25B in part of the light guide plate 354 in cross section perpendicular to the direction in which light emitted by the light source 342 is admitted.

Where the groove 354a is formed in the light guide plate 354, a reflection film 346 can be easily provided on the inside of the light guide plate 354.

INDUSTRIAL APPLICABILITY

The inventive planar lighting device may be used as a planar lighting device (backlight unit) employed in liquid crystal display devices, over-head projectors, and illuminated advertising sign boards, and for indoor and outdoor illumination.

The invention claimed is:

1. A planar lighting device comprising:
a light source; and
at least one light guide plate disposed opposite to said light source,
wherein said light guide plate has a light entrance plane opposite to said light source and a light exit plane containing one side of said light entrance plane and increases in thickness perpendicular to said light exit plane with an increasing distance from said light entrance plane,
wherein said light guide plate contains scattering particles for scattering light entering through said light entrance plane and propagating inside of said light guide plate,
wherein said light guide plate is a flexible light guide plate formed of a transparent resin containing at least a plasticizer mixed therein, said plasticizer giving a flexibility to said light guide plate, and
wherein at least one of said light exit plane and a plane of said light guide plate in an opposite side of said light exit plane has at least one of an outwardly curved shape and an inwardly curved shape with respect to a direction of optical axis of the light emitted by said light source and incident on said light entrance plane.

2. The planar lighting device of claim 1, wherein said light exit plane has a rectangular contour.

3. The planar lighting device of claim 1, wherein said light exit plane is parallel to a direction of optical axis of the light emitted by said light source and incident on said light entrance plane, and wherein a plane of said light guide plate in an opposite side of said light exit plane is inclined with respect to said direction of optical axis.

4. The planar lighting device of claim 1, wherein said light exit plane is inclined with respect to a direction of optical axis of the light emitted by said light source and incident on said light entrance plane, and wherein a plane of said light guide plate in an opposite side of said light exit plane is parallel to said direction of optical axis.

5. The planar lighting device of claim 1, wherein said light exit plane and a plane of said light guide plate in an opposite side of said light exit plane are inclined with respect to a direction of optical axis of said light emitted by said light source and incident on said light entrance plane.

6. The planar lighting device of claim 1, wherein said light exit plane of said light guide plate and a plane of said light guide plate in an opposite side of said light exit plane are inclined symmetrically with respect to a direction of optical axis of said light emitted by said light source and incident on said light entrance plane in a cross section perpendicular to said light exit plane and perpendicular to said one side.

7. The planar lighting device of claim 1, wherein said at least one light guide plate comprises two or more of said light guide plates arranged such that a plane containing one side of said light exit plane and one side of said light entrance plane of one of said two or more light guide plates on one hand and a plane containing one side of said light exit plane and one side of said light entrance plane of another of said two or more light guide plates on the other hand are disposed adjacent each other.

8. The planar lighting device of claim 1, wherein the light is emitted only from a side of said light exit plane.

9. The planar lighting device of claim 1, comprising a reflection film disposed opposite to a plane of an opposite side of said light guide plate with respect to said light exit plane.

10. The planar lighting device of claim 1, wherein said light exit plane of said light guide plate is a first light exit plane and a plane of said light guide plate in an opposite side of said first light exit plane is a second light exit plane.

11. The planar lighting device of claim 1, wherein part of said light guide plate closer to said light entrance plane is formed of a different material than other parts of said light guide plate such that a relationship Nm>Ni is satisfied, where Nm denotes a refractive index of a material forming said part closer to said light entrance plane and Ni denotes a refractive index of a material forming said other part.

12. The planar lighting device of claim 1, further comprising reflection members provided on said light exit plane and a plane of said light guide plate in an opposite side of said light exit plane close to said light entrance plane of said light guide plate.

13. The device of claim 1, wherein said light guide plate has a first thickness D1 at one end where light enters and a second thickness D2 at another end opposite to the first end, wherein D2>D1 and a length L in a direction of light travel inside the plate, wherein a thickness profile of the light guide plate meets a characteristic $1/1000<(D2-D1)/(L/2)<1/10$.

14. The planar lighting device of claim 1, wherein said light source is an LED array comprising LED chips and a support member carrying said LED chips arranged in a row, and
wherein a relationship p >b > a is satisfied, where "a" denotes a length of each of said LED chips in a direction perpendicular to said light exit plane of said light guide plate, "b" denotes a length of each of said LED chips in a direction of arrangement of said LED array, and "p" denotes a pitch of arrangement of said of LED chips of said LED array.

15. The planar lighting device of claim 14,
wherein said light source comprises two or more of said LED arrays, each being said LED array having said LED chips arranged in a row, and
wherein said light source has a configuration such that said two or more LED arrays are stacked by using at least one of a mechanical joining method and a chemical bonding method in such a way that said LED chips arranged in a row of one of said two or more LED arrays and said LED chips arranged in a row of another of said two or more LED arrays are spaced a preset distance apart from each other.

16. The planar lighting device of claim 1, wherein said light source is configured using an LED array comprising RGB-LEDs arranged in a row, each including a red light emitting diode, a green light emitting diode and a blue light emitting diode, and
lenses, each provided respectively for said red light emitting diode, said green light emitting diode and said blue light emitting diode on a light emitting side.

17. The planar lighting device of claim 16, wherein said lenses are spherical, transparent ball lenses.

18. The planar lighting device of claim 16,
wherein said light source comprises two or more of said LED arrays, each being said LED array having said RGB-LEDs chips arranged in a row, and
wherein said light source has a configuration such that said two or more LED arrays are stacked by using at least one of a mechanical joining method and a chemical bonding method in such a way that said RGB-LEDs arranged in a row of one of said two or more LED arrays and said RGB-LEDs arranged in a row of another of said two or more LED arrays are spaced a preset distance apart from each other.

19. The planar lighting device of claim 1, wherein said light guide plate is provided with diffusion reflectors on at least one plane of said light guide plate excluding said light entrance plane.

20. The planar lighting device of claim 19, wherein said diffusion reflectors are provided at a density increasing with an increasing distance from said light entrance plane.

21. The planar lighting device of claim 19, wherein said diffusion reflectors are provided on a plane of said light guide plate in an opposite side of said light exit plane.

22. A planar lighting device comprising:
a light source; and
at least one light guide plate disposed opposite to said light source,
wherein said light guide plate has a light entrance plane opposite to said light source and a light exit plane containing one side of said light entrance plane and increases in thickness perpendicular to said light exit plane with an increasing distance from said light entrance plane,
wherein said light guide plate contains scattering particles for scattering light entering through said light entrance plane and propagating inside of said light guide plate, and
wherein at least one of said light exit plane and a plane of said light guide plate in an opposite side of said light exit plane has at least one of an outwardly curved shape and an inwardly curved shape with respect to a direction of optical axis of the light emitted by said light source and incident on said light entrance plane.

23. A planar lighting device comprising:
a light source: and
at least one light guide plate disposed opposite to said light source,
wherein said light guide plate has a light entrance plane opposite to said light source and a light exit plane containing one side of said light entrance plane and increases in thickness perpendicular to said light exit plane with an increasing distance from said light entrance plane,
wherein said light guide plate contains scattering particles for scattering light entering through said light entrance plane and propagating inside of said light guide plate, and
wherein said scattering particles contained in said light guide plate satisfy an expression (1) below:

$$1.1 \leqq \Phi \cdot N_p \cdot L_G \cdot K_C \leqq 8.2 \quad (1)$$

(where $\Phi$ denotes a scattering cross section of said scattering particles, $L_G$ denotes a length of said light guide plate in a direction in which the light is launched, $N_p$ denotes a density of said scattering particles, and $K_C$ denotes a compensation coefficient in a range of $0.005 \leqq K_C \leqq 0.1$.

* * * * *